(12) United States Patent
Smith et al.

(10) Patent No.: US 12,491,681 B2
(45) Date of Patent: Dec. 9, 2025

(54) STATIC MIXING NOZZLES FOR LONG FIBER AND RESIN MIXING AND DISPERSING IN POLYMER ADDITIVE MANUFACTURING

(71) Applicant: UT-Battelle, LLC, Oak Ridge, TN (US)

(72) Inventors: Tyler C. Smith, Knoxville, TN (US); Ahmed A. Hassen, Knoxville, TN (US); John M. Lindahl, Powell, TN (US); Christopher J. Hershey, Knoxville, TN (US); Vlastimil Kunc, Knoxville, TN (US); Vipin Kumar, Knoxville, TN (US); James W. Klett, Knoxville, TN (US); Brian K. Post, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 207 days.

(21) Appl. No.: 18/375,019

(22) Filed: Sep. 29, 2023

(65) Prior Publication Data

US 2024/0383195 A1 Nov. 21, 2024

Related U.S. Application Data

(60) Provisional application No. 63/467,607, filed on May 19, 2023, provisional application No. 63/467,606, filed on May 19, 2023.

(51) Int. Cl.
*B29C 64/209* (2017.01)
*B01F 23/50* (2022.01)
(Continued)

(52) U.S. Cl.
CPC ............ *B29C 64/209* (2017.08); *B01F 23/51* (2022.01); *B01F 25/45211* (2022.01);
(Continued)

(58) Field of Classification Search
CPC ............ B01F 25/4315; B29K 2105/12; B29K 2105/122; B29K 2105/124;
(Continued)

(56) References Cited

U.S. PATENT DOCUMENTS

| | | | |
|---|---|---|---|
| 3,942,765 A | 3/1976 | Henrickson | |
| 2014/0014270 A1* | 1/2014 | Shah .................. | B01F 25/4316 366/165.2 |
| 2020/0061910 A1 | 2/2020 | Lewis et al. | |

FOREIGN PATENT DOCUMENTS

DE 102022134439 A1 * 6/2024 ............. A61L 27/20

OTHER PUBLICATIONS

<https://www.promix-solutions.com/en/mixing>; accessed Aug. 30, 2023.

(Continued)

*Primary Examiner* — JaMel M Nelson
(74) *Attorney, Agent, or Firm* — Fox Rothschild LLP

(57) ABSTRACT

An additive manufacturing system for additive manufacturing material with long fibers includes an extruder comprising a nozzle that includes a static-mixing portion, a compression portion, and a long fiber alignment portion. The static-mixing portion includes a static-mixing channel with static-mixing rods distributed inside and extending radially inward from a channel wall. The long fiber alignment portion has an alignment channel with a diameter $D_{AC}$ that is less than a diameter $D_{SMC}$ of the static-mixing channel. The compression portion includes with a reducing diameter from an input end to an output end of the compression channel. A nozzle and method for additive manufacturing are also disclosed.

17 Claims, 16 Drawing Sheets

(51) Int. Cl.
*B01F 25/452* (2022.01)
*B01F 25/46* (2022.01)
*B29B 7/32* (2006.01)
*B29C 64/106* (2017.01)
*B29C 64/165* (2017.01)
*B29C 64/314* (2017.01)
*B29C 64/336* (2017.01)
*B33Y 10/00* (2015.01)
*B33Y 30/00* (2015.01)
*B33Y 40/00* (2020.01)
*B29K 105/14* (2006.01)
*B33Y 40/10* (2020.01)

(52) U.S. Cl.
CPC .............. *B01F 25/46* (2022.01); *B29B 7/325* (2013.01); *B29C 64/106* (2017.08); *B29C 64/165* (2017.08); *B29C 64/314* (2017.08); *B29C 64/336* (2017.08); *B33Y 10/00* (2014.12); *B33Y 30/00* (2014.12); *B33Y 40/00* (2014.12); *B29K 2105/14* (2013.01); *B33Y 40/10* (2020.01)

(58) Field of Classification Search
CPC .......... B29K 2105/126; B29K 2105/14; B29K 2105/145; B29C 64/106; B29C 64/112; B29C 64/118; B29C 64/124; B29C 64/165; B29C 64/209
See application file for complete search history.

(56) References Cited

OTHER PUBLICATIONS

Kennedy et al.: "Printing Polymer Blends Through in situ Active Mixing During Fused Filament Fabrication"Additive Manufacturing, vol. 36, Dec. 2020, 101233.

Lan et al.: "Active Mixing Nozzle for Multi-Material and Multi-Scale 3D Printing", Proceedings of the ASME 2017 12th International Manufacturing Science and Engineering Conference MSEC2017 Jun. 4-8, 2017, Los Angeles, CA, USA.

* cited by examiner

STATIC MIXING NOZZLES FOR LONG FIBER AND RESIN MIXING AND DISPERSING IN POLYMER ADDITIVE MANUFACTURING

CROSS-REFERENCE TO RELATED APPLICATIONS

This application claims priority to U.S. Provisional Patent Application No. 63/467,606 filed on May 19, 2023, titled "STATIC MIXING NOZZLES FOR LONG FIBER AND RESIN MIXING AND DISPERSING IN POLYMER ADDITIVE MANUFACTURING", and U.S. Provisional Patent Application No. 63/467,607 filed May 19, 2023, titled "STATIC MIXING NOZZLES FOR FIBER RANDOMIZATION IN LARGE SCALE ADDITIVE MANUFACTURING APPLICATIONS" the entire disclosures of which are incorporated herein by reference. This application is related to U.S. Utility patent application Ser. No. 18/375,085 titled "Static Mixing Nozzles for Fiber Randomization in Large Scale Additive Manufacturing Applications" and U.S. Utility patent application Ser. No. 18/375,053 titled "Highly Aligned Fiber Nozzle for Additive Manufacturing Applications", both filed on even date herewith, the entire disclosures of which are hereby fully incorporated by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in this invention.

FIELD OF THE INVENTION

The present invention relates generally to additive manufacturing, and more particularly to additive manufacturing with long and short-chopped fibers.

BACKGROUND OF THE INVENTION

Additive Manufacturing (AM) is used to create structures through extruding plastic or metal layer by layer. In the case of polymer processes, fibers are typically added to increase stiffness and reduce warping during building. Additive manufacturing for thermoplastics includes the conversion of a polymer feedstock, such as filament, pellets, powder, thermoset, and the like, to a structure in space, created layer by layer until a near-net shape component is complete. During this process, toolpaths are created in specific widths per pass, e.g., bead width, and height, for example layer height. Machines on the market for this space range from a desktop scale of around 0.3 m×0.3 m×0.3 m in X, Y, and Z directions, up to large scale, such as big area AM (BAAM, Cincinnati, Inc.) with a print scale of 6 m×2.4 m×1.8 m (X, Y, and Z directions). While small-scale systems are often used for rapid prototyping, fine resolution printing, and new material trials, larger systems are used to create custom tooling components, complex core designs, and conventional rapid prototyping. During large-scale printing, shrinkages occur from the heating and cooling of layers at different rates and beads, leading to cracking and warping. To add stiffness to the structure, fillers such as carbon fiber, glass fiber, and wood fiber are added to help prevent these distortions. While adding these fillers increases the stiffness and helps mitigate the fundamental issues of warping, they also introduce anisotropy to the structure. Fibers tend to align along the print direction due to the shear introduced during extrusion. The fiber alignment can help in high stiffness and strength along the print direction but can cause significantly lower stiffness and strength along the layer-layer direction, such as the Y- and Z-directions. Differences in fiber alignment can create anisotropy in the composite's mechanical properties and affect its thermal expansion coefficient (CTE). CTE anisotropy becomes a severe issue during larger prints. In addition, the extrusion process creates defects within the bead, such as micro-porosity. These porosities decrease the mechanical properties of the components. The surface porosities are also undesirable in mold/die applications, where high vacuum surfaces integrity is required.

The type of fiber being used as well as the length of the fiber retained after extrusion has a direct impact on the mechanical performance of the polymer. Continuous fiber composites are long strands of fiber that is pultruded, extruded, or done in a layup fashion to create components with strands of fiber that stretch across the entirety of the part width/length. These composites have significantly higher mechanical performance properties than the short-chopped fiber counterparts. The large difference in properties stems from the difference in the ability of the fiber to transfer load through a continuous fiber and through a network of short fibers with resin gaps between individual fibers. However, there is a critical fiber length that when achieved creates a structure that will gain large performance enhancement like the continuous fiber counterpart due to the ability to transfer the load. As such, there is a high demand for long fiber composites in industry for compression molding and additive manufacturing.

Long fiber materials coming from pultruded pellets can be difficult to process in the additive manufacturing equipment. Large pellet lengths are required to retain improved fiber length after the additive manufacturing equipment's screw breaks the fiber down. Longer pellets have higher potential to bridge and block pellet flow at the entrance of the additive manufacturing equipment's extruder. Extrudates coming from the extruder tend to become highly porous with random fiber orientation. Even if fiber length can be maintained through the extruder to a degree, without fiber alignment, the benefits of long fibers will not be obtained the desired level. Assuming the fibers were aligned properly, the amount of porosity in the bead would not be suitable for additive manufacturing and lead to part failure. These two fundamental issues must be addressed to introduce long fibers into the additive space.

Large scale polymer additive manufacturing conventionally uses short-chopped fiber pellets to print structures in a layer-by-layer fashion. The length of the fiber limits the mechanical performance of the structure due to the average fiber length being less than a critical fiber length. To increase the overall fiber length, long fiber pellets can be used, e.g., up to 1.0" in length, to increase mechanical performance of the extrudate. However, long fiber pellets can be difficult to process and tend to come out of the extruder with high amounts of porosity and very low fiber alignment. This issue has been addressed conventionally by mixing long fiber pellets with short-chopped fiber pellets to increase bead consolidation. It has been observed that long fiber bundles are creating porosity inside the mixed polymer beads.

The BAAM system is equipment with a multi-material system which allows for multiple different materials be extruded within a single structure. There are hoppers that can switch between open and closed to send two different materials down the same single screw extruder. When using two different materials within the same print, the print can either be paused to purge out the first material and switch to the second, or the print can resume leading to a transition zone having a mixture of the two materials within the part. During the printing process, the transition section of the print can form islands of the two distinct materials, which is not ideal for mechanical properties. These issues are also apparent when trying to make hybrid materials by mixing different pellets within the screw. In addition, a BAAM system can use multi-material printing through a single screw. This however creates a transition zone were both materials are present in a part. These two materials tend to create islands within a bead that will lower mechanical performance and lower the consistency in mechanical output.

SUMMARY OF THE INVENTION

An additive manufacturing system for additive manufacturing material with long fibers includes an extruder comprising a nozzle that includes a static-mixing portion, a compression portion, and a long fiber alignment portion. The static-mixing portion includes a static-mixing channel defined by a channel wall, the static-mixing channel having a longitudinal center axis, a circumference, a diameter $D_{SMC}$ and a length $L_{SMC}$, an input end and an opposing output end. The static-mixing channel can be fluidically coupled at the input end to feeding means through which additive manufacturing material and long fibers are to be provided to the extruder. The static-mixing channel includes static-mixing rods distributed inside the static-mixing channel and extending radially inward from the channel wall. The static-mixing rods have a diameter $D_{SMR}$, and are longitudinally distributed over a portion of the length $L_{SMC}$ of the static-mixing channel and radially staggered about the circumference of the channel wall. Spaces between the static-mixing rods define flow openings for the additive manufacturing material and the long fiber.

The long fiber alignment portion includes an alignment channel having an input end and an output end and a diameter $D_{AC}$ that is less than the diameter $D_{SMC}$ of the static-mixing channel, and has a length longer than the length of the long fibers.

The compression portion includes a compression channel with an input end communicating with the output end of the static-mixing channel, and an output end communicating with the input end of the alignment channel. The compression channel has a reducing diameter from the input end to the output end of the compression channel. The compression channel fluidically couples the larger diameter static-mixing channel to the smaller diameter alignment channel.

The static-mixing portion is configured to guide the provided additive manufacturing material and long fiber from the input end to the compression portion, cause bundles of the long fiber to separate as they are guided through the openings formed by the static-mixing rods inside the static-mixing channel to disperse the long fiber of the separated bundles through the additive manufacturing material, and transfer the additive manufacturing material with the long fiber dispersed therethrough to the compression portion. The compression channel compresses and guides the additive manufacturing material and long fiber from the static-mixing channel to the input end of the alignment channel. The alignment channel further compresses the additive manufacturing material with the long fiber dispersed therethrough to align the dispersed long fiber, guide the compressed additive manufacturing material with the aligned long fiber to the output end of the alignment channel, and extrude, through the output end of the alignment channel, a bead of compressed additive manufacturing material with the long fiber dispersed and aligned therethrough. The extruded bead is deposited as part of a layer of an object being formed by the additive manufacturing material and long fiber.

The static-mixing rods can be cylindrical. The static-mixing channel can be tubular. The static-mixing rods can extend from one connecting location on the channel wall to another connecting location on the channel wall. The connecting locations of a static-mixing rod can be at different longitudinal positions of the channel wall. The static-mixing rods can intersect the longitudinal center axis of the static-mixing channel. The static-mixing rods can be axially spaced apart from each other by separations ranging from 0 to $5 \times D_{SMR}$.

The compression channel can be conical. The length range of the long fiber can be 0.5 mm to 30 mm. The system can include short-chopped fibers. A fiber aspect ratio can be defined as $s=L/d$, where L is the fiber's length and d is the fiber's diameter, and the fiber aspect ratio of the short-chopped fiber can satisfy $s<100$, and the fiber aspect ratio of the long fiber can satisfy $s \geq 100$. The fraction of long fiber from the total of short-chopped fiber and long fiber can be in a range of 5%-100% by weight. The long fiber and the short-chopped fiber can include at least one selected from the group consisting of carbon fiber, glass fiber, or bio fiber. The additive manufacturing material can be a thermoplastic resin.

A static-mixing nozzle for an additive manufacturing system includes a static-mixing portion, a compression portion, and a long fiber alignment portion. The static-mixing portion includes a static-mixing channel defined by a channel wall. The static-mixing channel has a longitudinal center axis, a circumference, a diameter $D_{SMC}$ and a length $L_{SMC}$, an input end and an opposing output end. The static-mixing channel can be fluidically connectable at the input end to feeding means through which additive manufacturing material and long fibers are to be provided. The static-mixing channel includes static-mixing rods distributed inside the static-mixing channel and extending radially inward from the channel wall. The static-mixing rods having a diameter $D_{SMR}$, and can be longitudinally distributed over a portion of the length $L_{SMC}$ of the static-mixing channel and radially staggered about the circumference of the channel wall. Spaces between the static-mixing rods define flow openings for the additive manufacturing material and the long fiber.

The long fiber alignment portion includes an alignment channel having an input end and an output end and a diameter $D_{AC}$ that is less than the diameter $D_{SMC}$ of the static-mixing channel, and has a length longer than the length of the long fibers.

The compression portion comprises a compression channel with an input end communicating with the output end of the static-mixing channel, and an output end communicating with the input end of the alignment channel. The compression channel has a reducing diameter from the input end to the output end of the compression channel. The compression channel fluidically couples the larger diameter static-mixing channel to the smaller diameter alignment channel;

The static-mixing portion is configured to guide the provided additive manufacturing material and long fiber from the input end to the compression portion, cause bundles of the long fiber to separate as they are guided through the openings formed by the static-mixing rods inside the static-mixing channel to disperse the long fiber of the separated bundles through the additive manufacturing material, and transfer the additive manufacturing material with the long fiber dispersed therethrough to the compression portion. The compression channel compresses and guides the additive manufacturing material and long fiber from the static-mixing channel to the input end of the alignment channel. The alignment channel further compresses the additive manufacturing material with the long fiber dispersed therethrough to align the dispersed long fiber, guide the compressed additive manufacturing material with the aligned long fiber to the output end of the alignment channel, and extrude, through the output end of the alignment channel, a bead of compressed additive manufacturing material with the long fiber dispersed and aligned therethrough. The extruded bead is deposited as part of a layer of an object being formed by the additive manufacturing material and long fiber.

A method for additive manufacturing with additive manufacturing material and long fibers includes the step of providing an extruder comprising a nozzle that includes a static-mixing portion, a compression portion, and a long-fiber alignment portion. The static-mixing portion includes a static-mixing channel defined by a channel wall. The static-mixing channel has a longitudinal center axis, a circumference, a diameter $D_{SMC}$ and a length $L_{SMC}$, an input end and an opposing output end. The static-mixing channel can be fluidically coupled at the input end to feeding means through which additive manufacturing material and long fibers are to be provided to the extruder. The static-mixing channel includes static-mixing rods distributed inside the flow channel and extending radially inward from the channel wall, the static-mixing rods having a diameter $D_{SMR}$, and are longitudinally distributed and radially staggered over a portion of the length $L_{SMC}$ of the static-mixing channel. Spaces between the rods define flow openings for the additive manufacturing material and the long fiber. The long fiber alignment portion comprises an alignment channel having a diameter $D_{AC}$ that is less than the diameter $D_{SMC}$ of the static-mixing channel, and a length longer than the long fibers. The compression portion comprises a compression channel with an input end communicating with the output end of the static-mixing channel, and an output end communicating with the input end of the alignment channel. The compression channel has a reducing diameter from the input end to the output end of the compression channel. The compression channel fluidically couples the larger diameter static-mixing channel to the smaller diameter alignment channel;

The provided additive manufacturing material and long fiber are guided through the static-mixing portion from the input end to the compression portion, causing bundles of the long fiber to separate as they are guided through the openings formed by the static-mixing rods inside the static-mixing channel to disperse the long fiber of the separated bundles through the additive manufacturing material. The additive manufacturing material with the long fiber dispersed therethrough are transferred to the compression channel, wherein the compression channel compresses and guides the additive manufacturing material and long fiber from the static-mixing channel to the alignment channel. The additive manufacturing material with the long fiber dispersed therethrough are further compressed in the alignment channel to align the dispersed long fiber. The compressed additive manufacturing material with the aligned long fiber are guided to the output end of the alignment channel. The method continues with extruding, through the output end, a bead of compressed additive manufacturing material dispersed with the long fiber dispersed and aligned therethrough. The bead is deposited as part of a layer of an object being formed by the additive manufacturing material and long fiber. The method can further comprising the step of adding short-chopped fibers to the additive manufacturing material and the long fibers prior to entering the static-mixing channel, wherein the static-mixing rods will mix the short-chopped fibers with the ling fibers and the additive manufacturing material.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
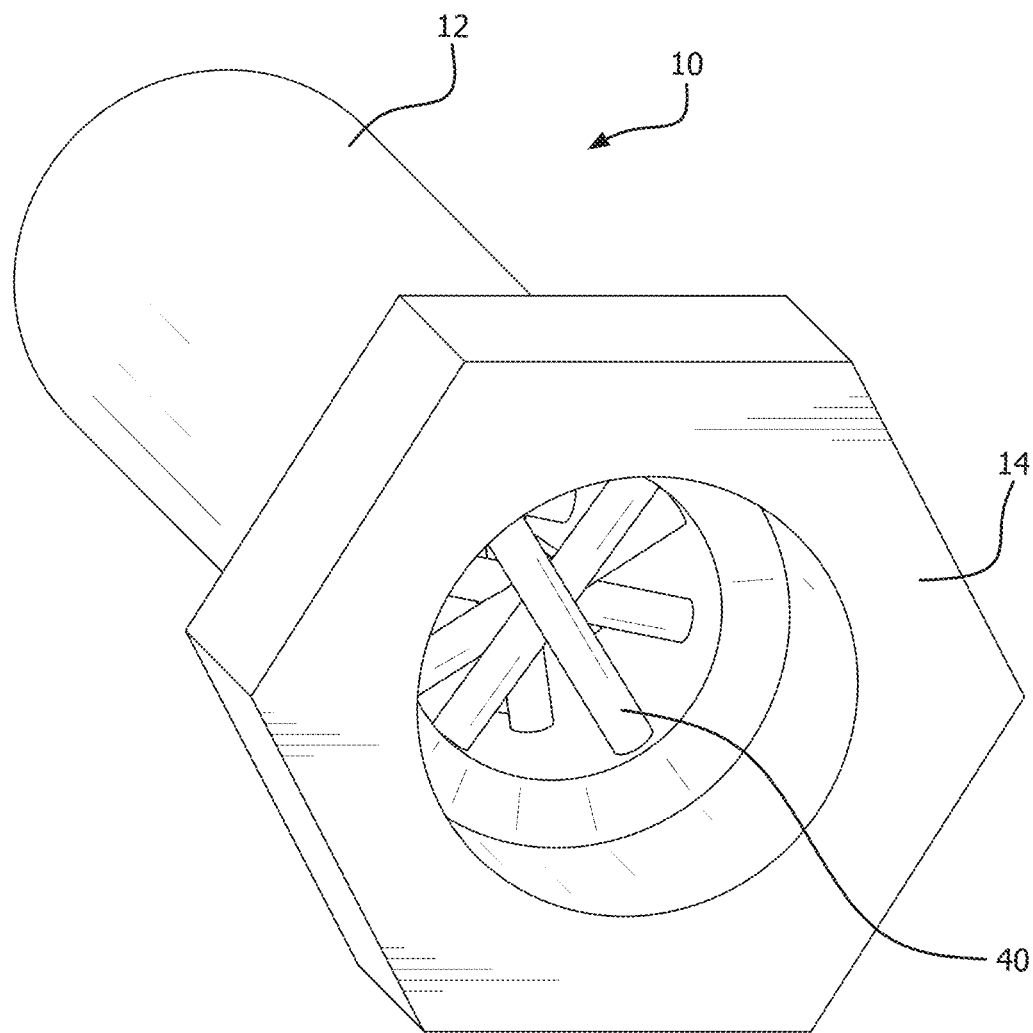
FIG. 1 is a top perspective view of a static-mixing nozzle.
Figure 2:
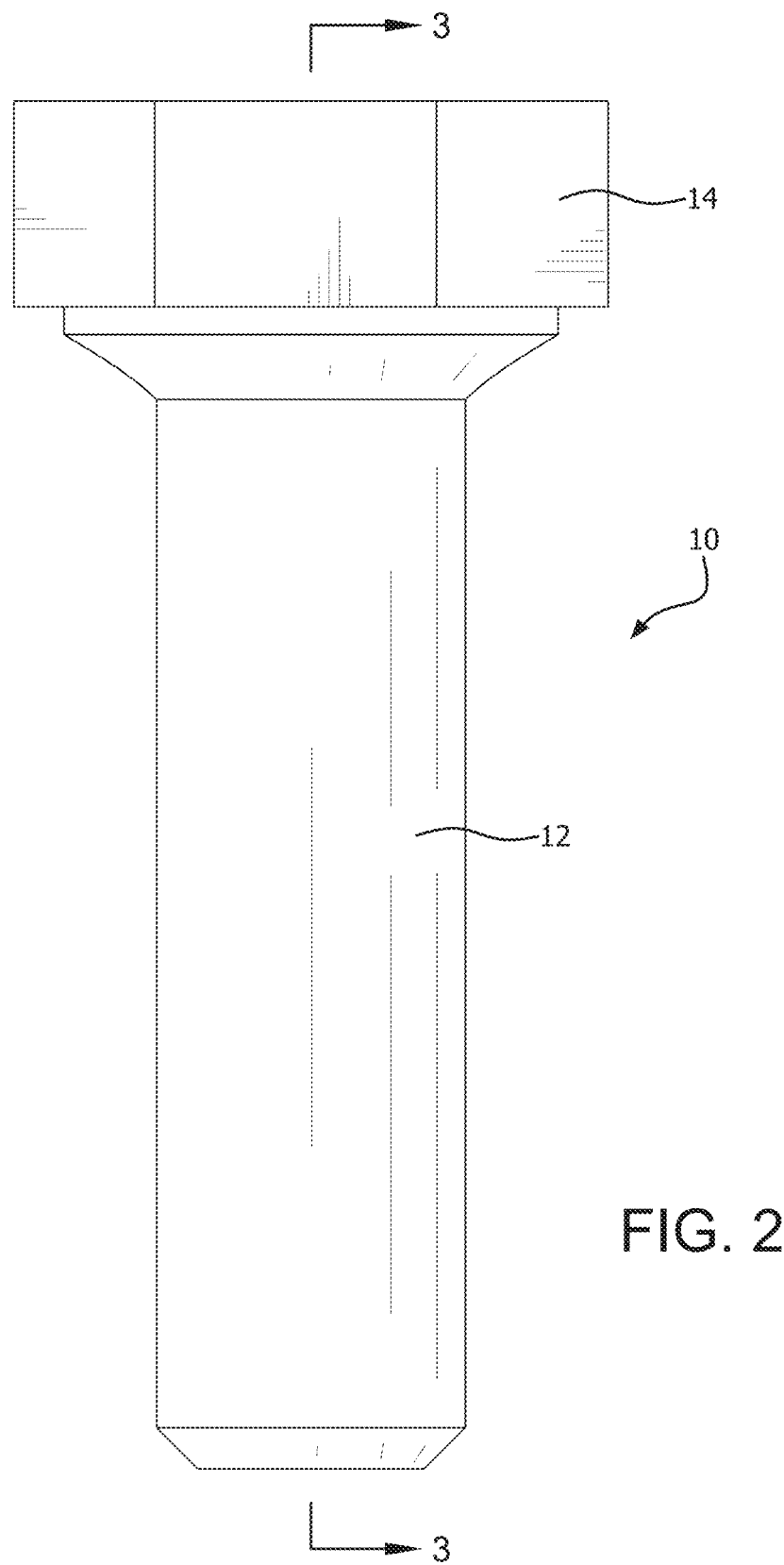
FIG. 2 is a side elevation.
Figure 3:
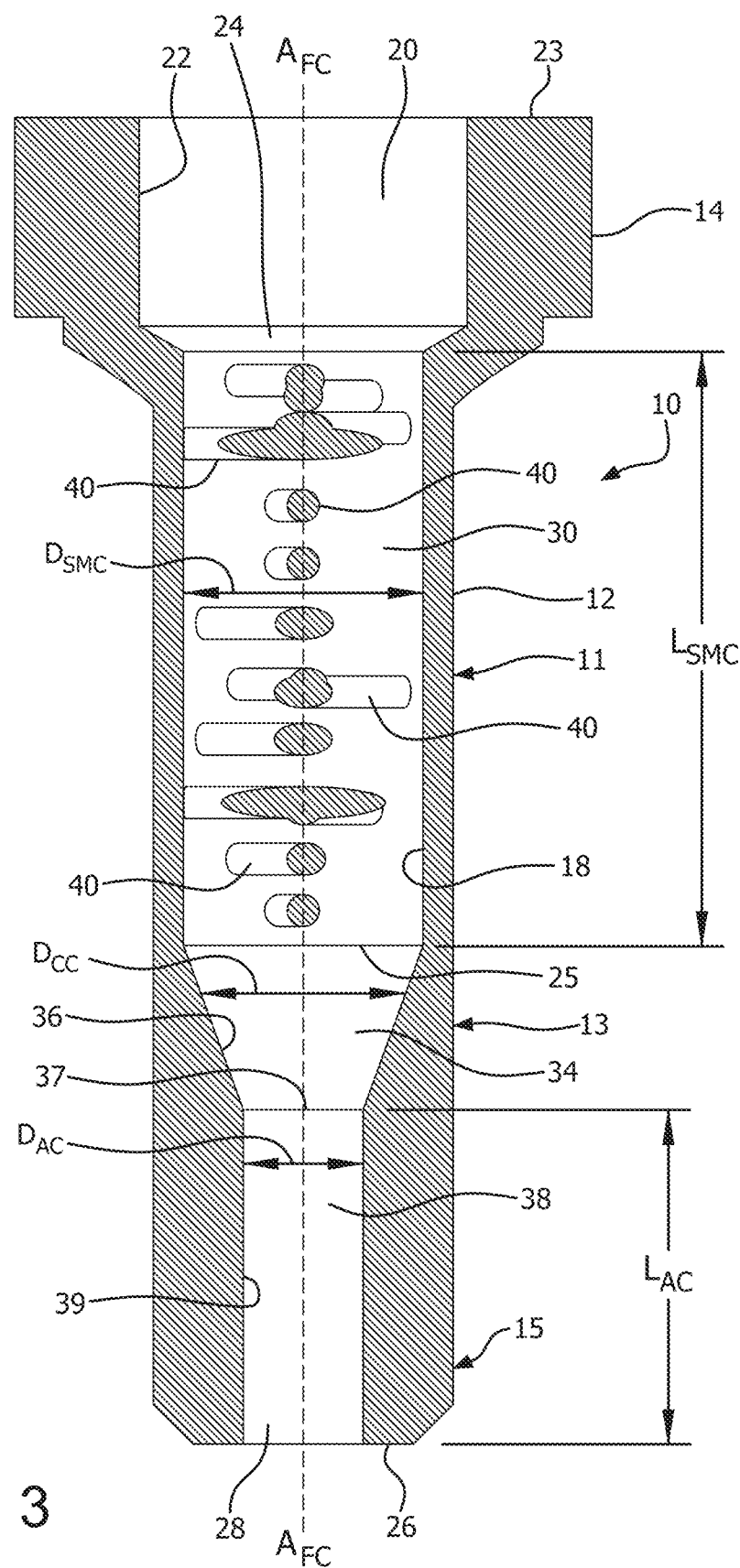
FIG. 3 is a cross-section taken along line 3-3 in FIG. 2
Figure 4:
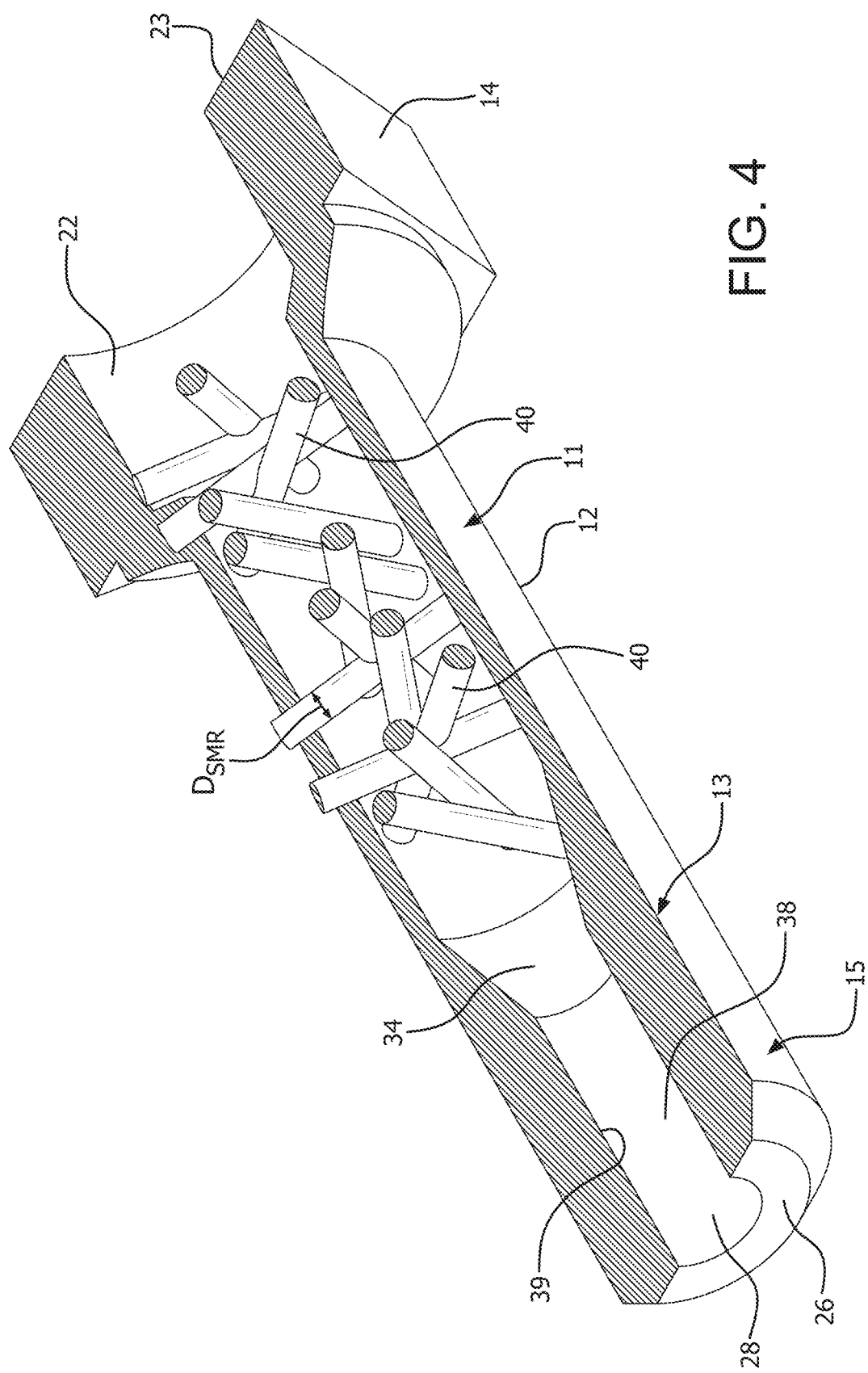
FIG. 4 is a bottom perspective view of the cross-section of FIG. 3.
Figure 5:
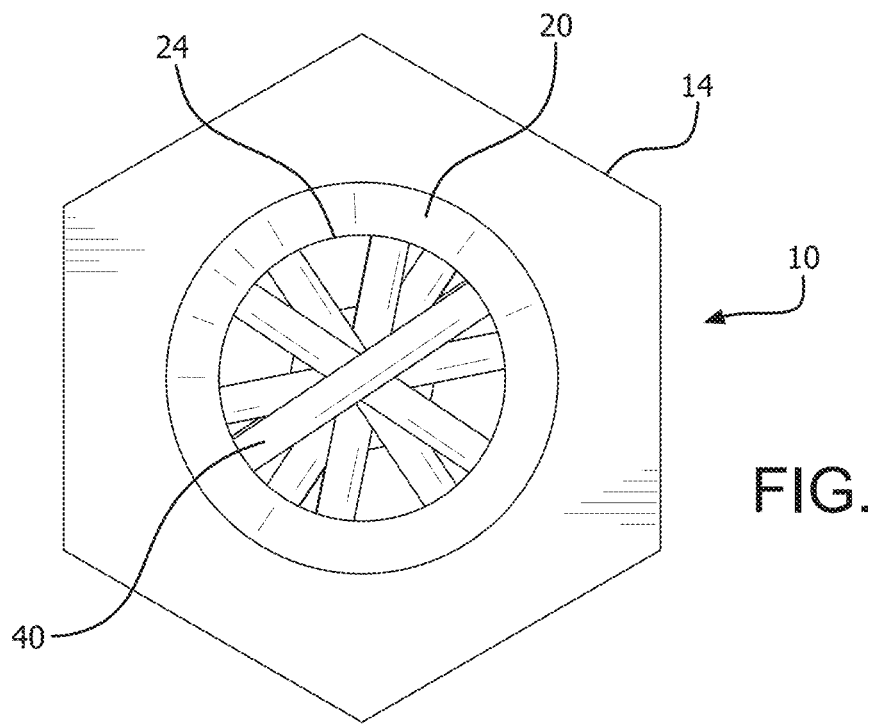
FIG. 5 is a top plan view.
Figure 6:
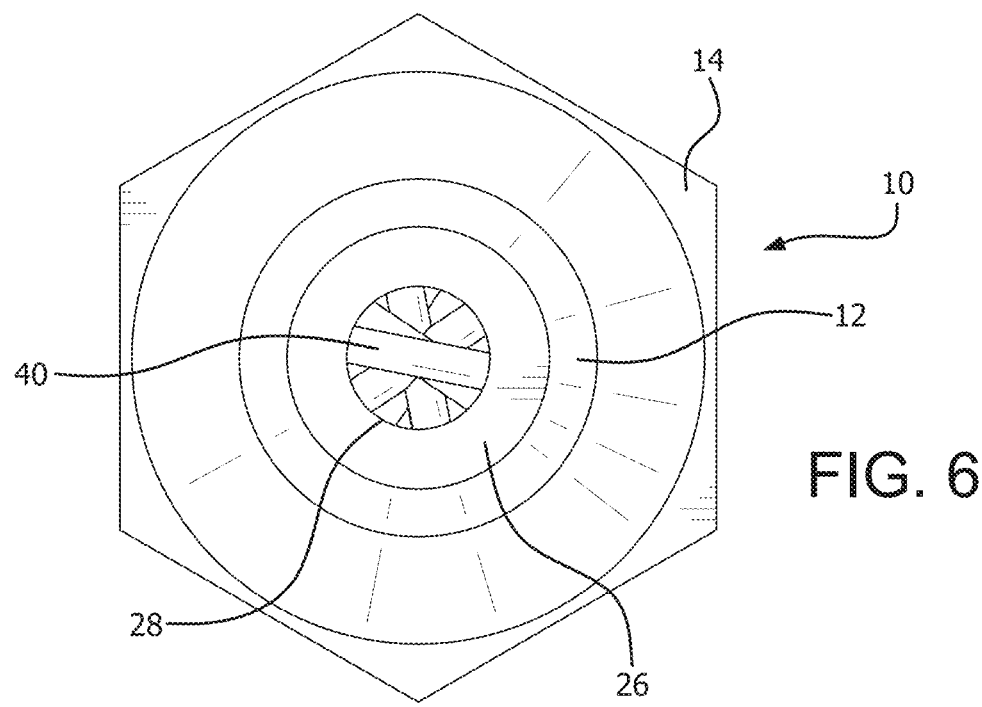
FIG. 6 is a bottom view.

An additive manufacturing system for additive manufacturing material with long fibers incudes an extruder having a nozzle that includes a static-mixing portion, a compression portion, and a long fiber alignment portion. The static-mixing portion includes a static-mixing channel defined by a channel wall. The static-mixing channel has a longitudinal center axis Arc, a diameter $D_{SMC}$ and a length $L_{SMC}$, an input end and an opposing output end. The static-mixing channel is fluidically coupled at the input end to feeding means through which additive manufacturing material and long fibers are to be provided to the extruder. The static-mixing channel includes static-mixing rods distributed inside the static-mixing channel and extending radially inward from the channel wall. The static-mixing rods have a diameter $D_{SMR}$, and are longitudinally distributed over a portion of the length $L_{SMC}$ of the static-mixing channel and radially staggered about the circumference of the channel wall. Spaces between the static-mixing rods define flow openings for the additive manufacturing material and the long fiber.

The long fiber alignment portion includes an alignment channel having an input end and an output end and a diameter $D_{AC}$ that is less than the diameter $D_{SMC}$ of the static-mixing channel, and has a length $L_{AC}$ longer than the length of the long fibers.

The compression portion comprises a compression channel with an input end communicating with the output end of the static-mixing channel, and an output end communicating with the input end of the alignment channel. The compression channel has a diameter $D_{CC}$ that reduces from the input end to the output end of the compression channel, in the direction of flow of the additive manufacturing material. The compression channel fluidically couples the larger diameter static-mixing channel to the smaller diameter alignment channel.

The static-mixing portion is configured to guide the provided additive manufacturing material and long fiber from the input end to the compression portion, and to cause bundles of the long fiber to separate as they are guided through the openings formed by the static-mixing rods inside the static-mixing channel to disperse the long fiber of the separated bundles through the additive manufacturing material. The static-mixing portion transfers the additive manufacturing material with the long fiber dispersed therethrough to the compression portion, wherein the compression channel compresses and guides the additive manufacturing material and long fiber from the static-mixing channel to the input end of the alignment channel. The alignment channel further compresses the additive manufacturing material with the long fiber dispersed therethrough to align the dispersed long fiber, and guides the compressed additive manufacturing material with the aligned long fiber to the output end of the alignment channel. The compressed additive manufacturing material with the aligned long fiber is then extruded through the output end of the alignment channel. A bead of compressed additive manufacturing material with the long fiber is thereby dispersed and aligned therethrough, causing the extruded bead to be deposited as part of a layer of an object being formed by the additive manufacturing material and long fiber.

The static mixing rods are elongated with a length that is at least twice as long as the width. The static mixing rods can be cylindrical, but the invention is not limited in this regard. The static mixing rods should avoid sharp edges such as square shapes or triangular cross-sectional shapes which could damage the fibers, but otherwise can have any curving shapes such as oval shapes and ellipse shapes.

The static-mixing channel can be tubular. The static mixing channel can have other shapes such as oval and square. The static-mixing channel can also have differing dimensions of length and diameter.

The static-mixing rods extend from one connecting location on the channel wall to another connecting location on the channel wall. The connecting locations of a static-mixing rod are at different longitudinal positions of the channel wall. The static-mixing rods can intersect the longitudinal center axis of the static-mixing channel.

The compression channel can have inclined walls in the direction of flow so as to compress the additive manufacturing material. The compression channel be conical. The incline of the walls and the dimensions of the compression channel can vary.

The static-mixing rods can be axially spaced apart from each other by separations ranging from 0 to $5 \times D_{SMR}$. The static-mixing rods can be axially spaced apart from each other by separations of 0, 0.25, 0.5, 0.75, 1, 1.25, 1.5, 1.75, 2, 2.25, 2.5, 2.75, 3, 3.25, 3.5, 3.75, 4, 4.25, 4.5, 4.75, or 5 times the $D_{SMR}$, and can be within a range of any high value and low value selected from these values.

The length of the long fiber can be from 0.5 mm to 30 mm. The length of the long fiber can be 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 mm, and can be within a range of any high value and low value selected from these values.

The system can further be used with short-chopped fibers. Short-chopped fibers are fibers have a length in a range of from 1-500 um.

The fiber aspect ratio is defined as $s=L/d$, where L is the fiber's length and d is the fiber's diameter. The fiber aspect ratio of the short-chopped fiber can satisfy $s<100$, and the fiber aspect ratio of the long fiber can satisfy $s \geq 100$.

The fraction of long fibers relative to the total of long fibers and short fibers can vary. The fraction of long fiber to the total of short-chopped fiber and long fiber can be in a range of 5%-100% by weight. The fraction of long fiber to the total of short-chopped fiber and long fiber can be 5, 10, 15, 20, 25, 30, 35, 40, 45, 50, 55, 60, 65, 70, 75, 80, 85, 90, 95, or 100% by weight, and can be within a range of any high value and low value selected from these values.

The long fiber and the short-chopped fiber can comprise at least one selected from the group consisting of carbon fiber, glass fiber, or bio fiber. Other materials are possible.

The additive manufacturing material comprises thermoplastic resin. Other resins are possible. In addition, thermoset resins such as pastes, epoxies, and gels can be used as the fiber binding medium.

In the case of thermoplastic resins, pellets are typically defined as resins bound with or without a long or short chopped fiber embedded inside the resin. The bound fiber with resin is then cut to specific lengths, and diameters to be used as feedstock for various systems. In the case of long fiber pellets, the primary method of manufacturing is through a pultrusion process and cut to the desired pellet length which then also becomes the fiber starting length for extrusion.

A static-mixing nozzle for an additive manufacturing system includes a static-mixing portion, a compression portion, and a long fiber alignment portion. The static-mixing portion includes a static-mixing channel defined by a channel wall. The static-mixing channel has a longitudinal center axis, a circumference, a diameter $D_{SMC}$ and a length $L_{SMC}$, an input end and an opposing output end. The static-mixing channel is fluidically connectable at the input end to feeding means through which additive manufacturing material and long fibers are to be provided. The static-mixing channel includes static-mixing rods distributed inside the static-mixing channel and extending radially inward from the channel wall. The static-mixing rods having a diameter $D_{SMR}$, and are longitudinally distributed over a portion of the length $L_{SMC}$ of the static-mixing channel and radially staggered about the circumference of the channel wall. Spaces between the static-mixing rods define flow openings for the additive manufacturing material and the long fiber. The long fiber alignment portion has an alignment channel having an input end and an output end and a diameter $D_{AC}$ that is less than the diameter $D_{SMC}$ of the static-mixing channel, and has a length longer than the length of the long fibers. The compression portion includes a compression channel with an input end communicating with the output end of the static-mixing channel, and an output end communicating with the input end of the alignment channel. The compression channel has a reducing diameter from the input end to the output end of the compression channel. The compression channel fluidically couples the larger diameter static-mixing channel to the smaller diameter alignment channel.

The static-mixing portion is configured to guide the provided additive manufacturing material and long fiber from the input end to the compression portion, cause bundles of the long fiber to separate as they are guided through the openings formed by the static-mixing rods inside the static-mixing channel to disperse the long fiber of the separated bundles through the additive manufacturing material, and transfer the additive manufacturing material with the long fiber dispersed therethrough to the compression portion. The compression channel compresses and guides the additive manufacturing material and long fiber from the static-mixing channel to the input end of the alignment channel. The alignment channel further compresses the additive manufacturing material with the long fiber dispersed therethrough to align the dispersed long fiber, guide the compressed additive manufacturing material with the aligned long fiber to the output end of the alignment channel, and extrude, through the output end of the alignment channel, a bead of compressed additive manufacturing material with the long fiber dispersed and aligned therethrough, causing the extruded bead to be deposited as part of a layer of an object being formed by the additive manufacturing material and long fiber.

A method for additive manufacturing with additive manufacturing material and long fibers includes the step of providing an extruder comprising a nozzle as previously described. Additive manufacturing material and long fiber are guided through the static-mixing portion from the input end to the compression portion, causing bundles of the long fiber to separate and air pockets to break up as they contact the rod structures inside the flow channel to disperse the long fiber of the separated bundles through the additive manufacturing material. The additive manufacturing material with the long fiber dispersed therethrough are directed into to the compression channel. The compression channel compresses and guides the additive manufacturing material and long fiber from the static-mixing channel to the alignment channel. The additive manufacturing material with the long fiber dispersed therethrough are then directed to the alignment channel where they are further compressed and in the alignment channel the dispersed long fiber is aligned. The compressed additive manufacturing material with the aligned long fiber are guided to the output end of the alignment channel. A bead of compressed additive manufacturing material with the long fiber dispersed and aligned therethrough are extruded through the output end causing the extruded bead to be deposited as part of a layer of an object being formed by the additive manufacturing material and long fiber. The method can further comprise the step of adding short-chopped fibers to the additive manufacturing material and the long fibers prior to entering the static mixing channel, wherein the rod structures will mix the short-chopped fibers with the ling fibers and the additive manufacturing material.

The problem of porosity is created inherently during the additive manufacturing process and the solution is to compression mold the part after printing either by post-heating the printed preform and applying compression rapidly just after printing while the structure is still hot enough to deform. This process is known as additive manufacturing compression molding (AM-CM). AM-CM is being developed for creating preforms with the additive manufacturing process and then compression molding them to remove porosities and other defects to produce an end-use product. A significant advantage to using AM-CM is that fibers can be aligned along a particular direction before compression molding using an automated system, reinforcing specific directions and locations of a preform by maintaining fiber alignment after compression molding is complete. While fiber alignment can be attained with compression molding by doing layups, the angles and curvatures that can be achieved are limited. Using a conventional additive manufacturing system, any curvature desired can be obtained with the fibers aligned using the discontinuous fiber-filled polymers. While most conventional materials used on additive manufacturing are short-chopped fibers and have relatively consolidated extrudates, long fiber pellets can also be extruded to increase the average fiber length of the composite. Increased fiber length in composites can increase the part stiffness and strength when the fibers are aligned during deposition. However, printing with long fiber materials often introduces challenges for additive manufacturing, such as severe porosity, fiber breakage, and metering uniformity. Severe porosity and metering issues create problems for mechanical performance and deposition and make it difficult to produce large structures spanning multiple layers. Despite these issues, preforms only require 1-2 layers of printing, and the porosity issue and variations in extrusion can be removed or altered during compression molding to create a composite that starts with high amounts of defects and results in a final structure that is void-free, fiber aligned, and uniform.

There is shown in FIGS. 1-6 a nozzle 10 according to the invention. The nozzle 10 can include a nozzle body 12 and a nozzle head 14. The nozzle 10 had a static mixing portion 11, a compression portion 13, and a long fiber alignment portion 15. The static mixing portion 11 includes a channel wall 18 which defines an open interior static mixing channel 30 which has a diameter $D_{SMC}$. The nozzle 10 has a proximal end 23 and a distal end 26. The nozzle head 14 has an opening 20 defined by a wall 22 leading to an inlet 24 of the static mixing channel 30. The static mixing channel 30 has an outlet 25. The outlet 25 of the static mixing channel 30 communicates with the compression portion 13.

A plurality of static mixing rods 40 are provided within the static mixing channel 30 and are secured to the channel wall 18. The static mixing rods 40 extend radially into the static mixing channel 30. In one embodiment the static mixing rods 40 extend from one connecting location on the channel wall 18 to another connecting location on the channel wall 18. The static-mixing rods 40 can intersect the longitudinal center axis Arc of the static-mixing channel 30.

The static mixing channel 40 communicates through the outlet 25 which can serve as an inlet to the compression channel 34 of the compression portion 13. The compression channel 34 is defined by wall 36. The compression channel 34 has a diameter $D_{CC}$ that reduces in the direction of flow from the proximal end 23 to the distal end 26 of the nozzle 10.

The compression portion 13 has an outlet 37 which can serve as an inlet for a long fiber alignment channel 38 of the alignment portion 15. The long fiber alignment channel 38 is defined by wall 39 and has a distal outlet 28. The alignment channel 38 has a diameter $D_{AC}$ that is less than the diameter $D_{SMC}$ of the static-mixing channel 30, and has a length longer than the length of the long fibers.

Figure 7:
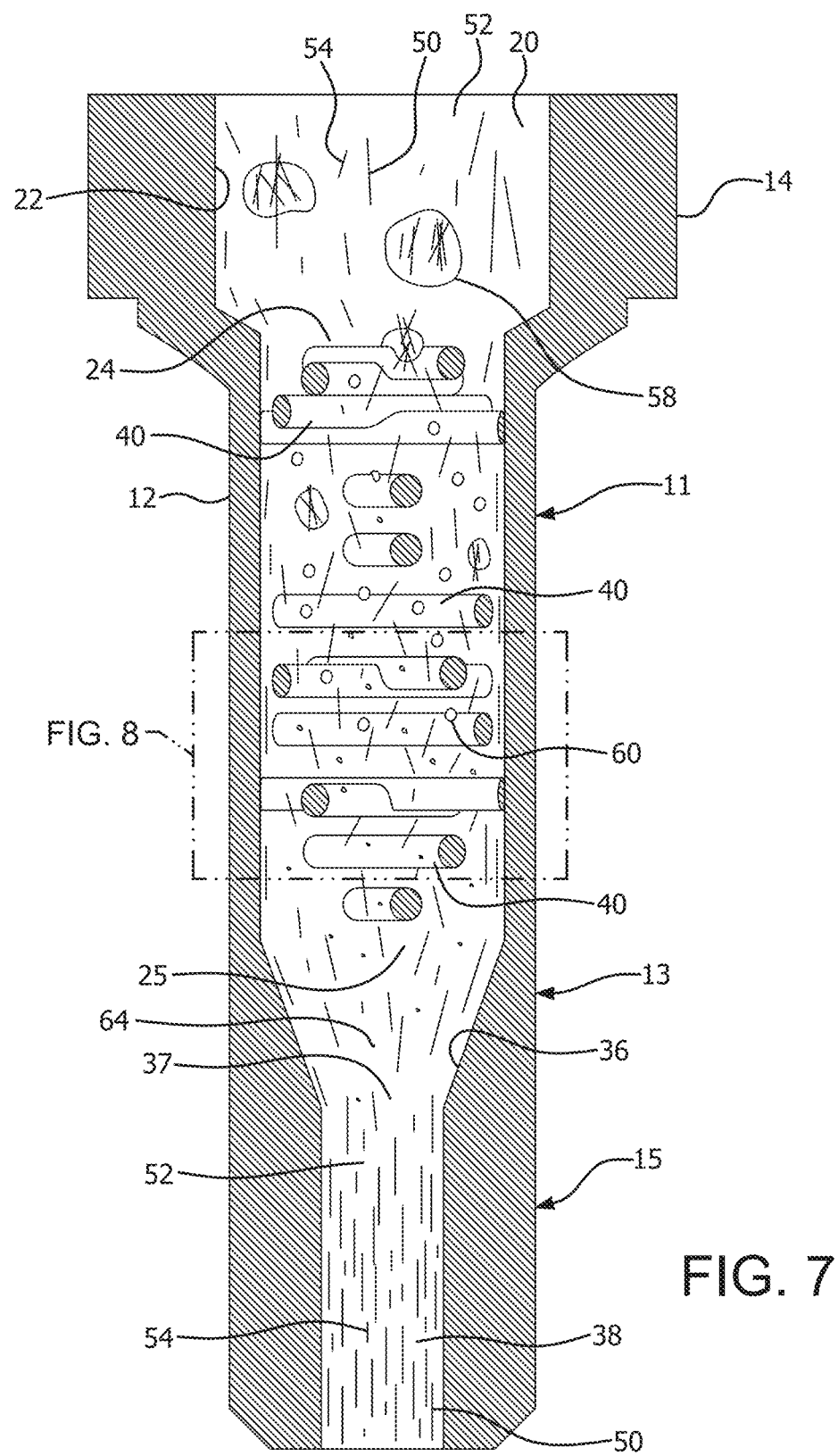
FIG. 7 is a cross-section taken along line 3-3 in FIG. 2, and illustrating operation of the static-mixing nozzle.
Figure 8:
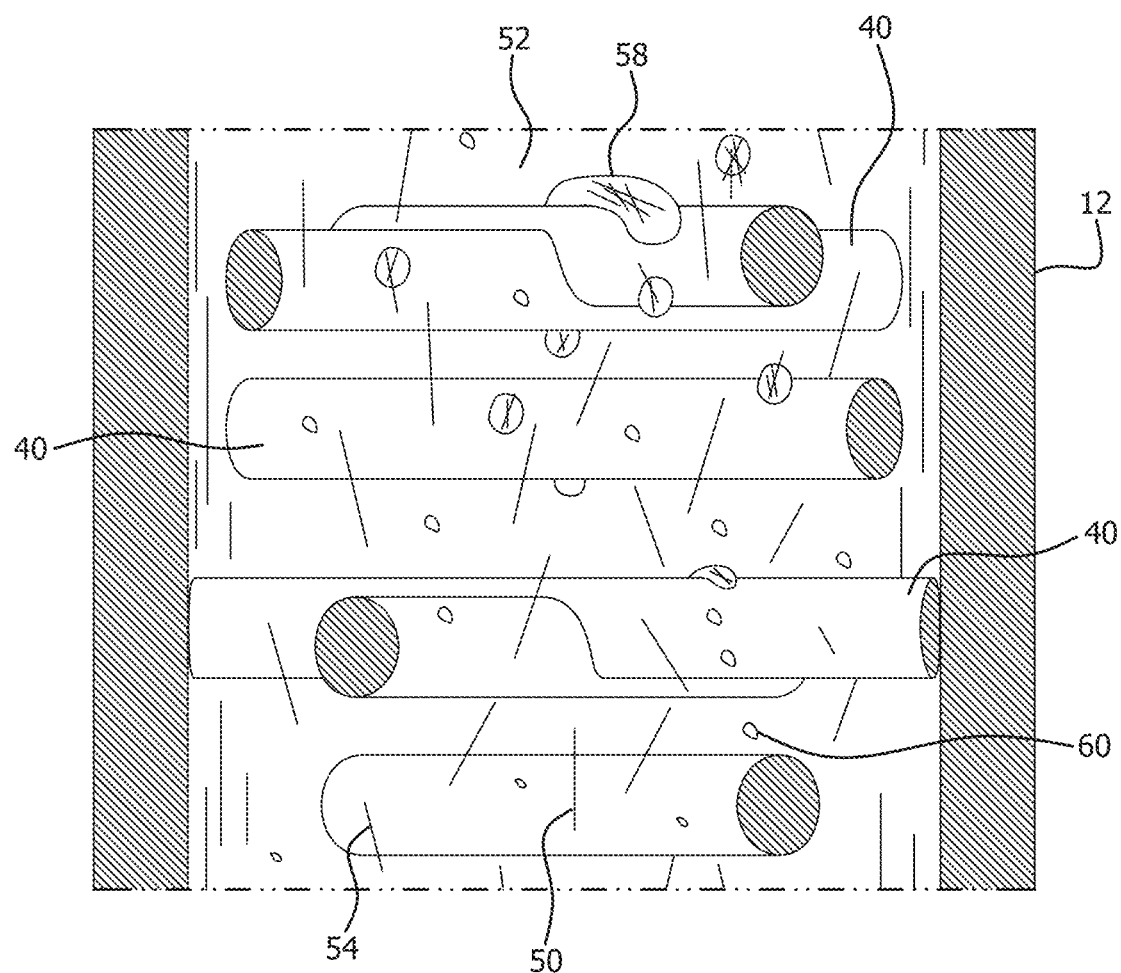
FIG. 8 is an expanded view of area FIG. 8 in FIG. 7.
Figure 9:
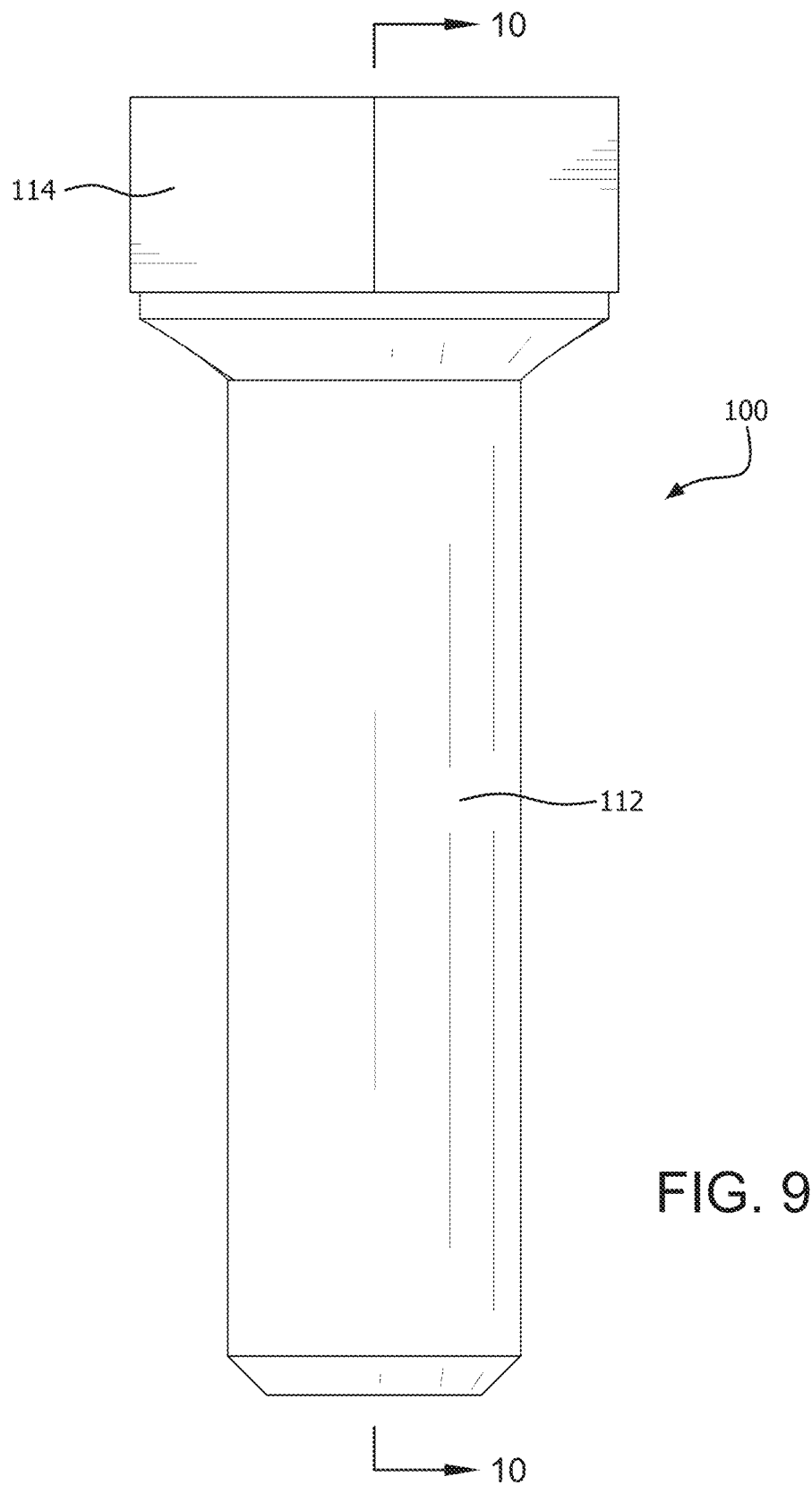
FIG. 9 is a side elevation of an alternative embodiment.
Figure 10:
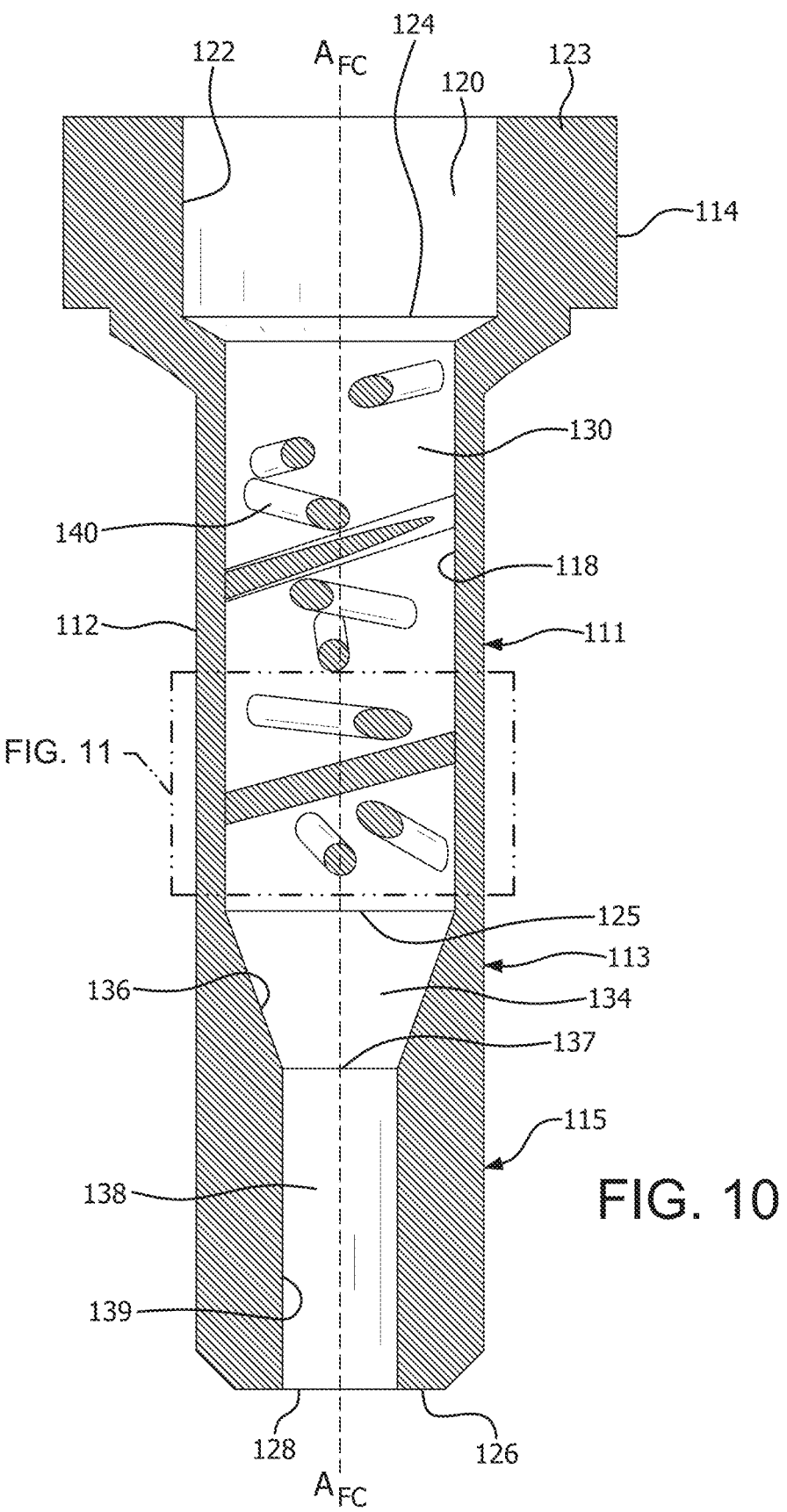
FIG. 10 is cross-section taken along line 10-10 in FIG. 9.
Figure 11:
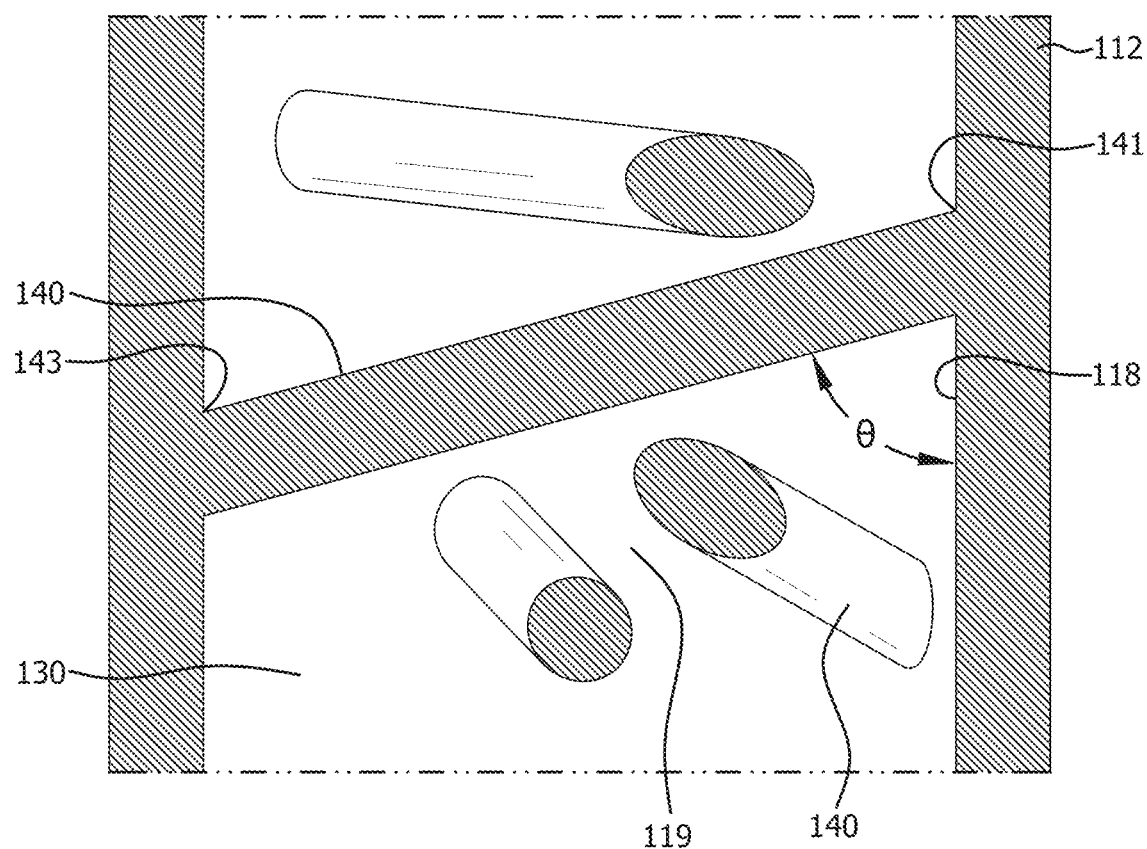
FIG. 11 is an expanded view of area FIG. 11 in FIG. 10.
Figure 12:
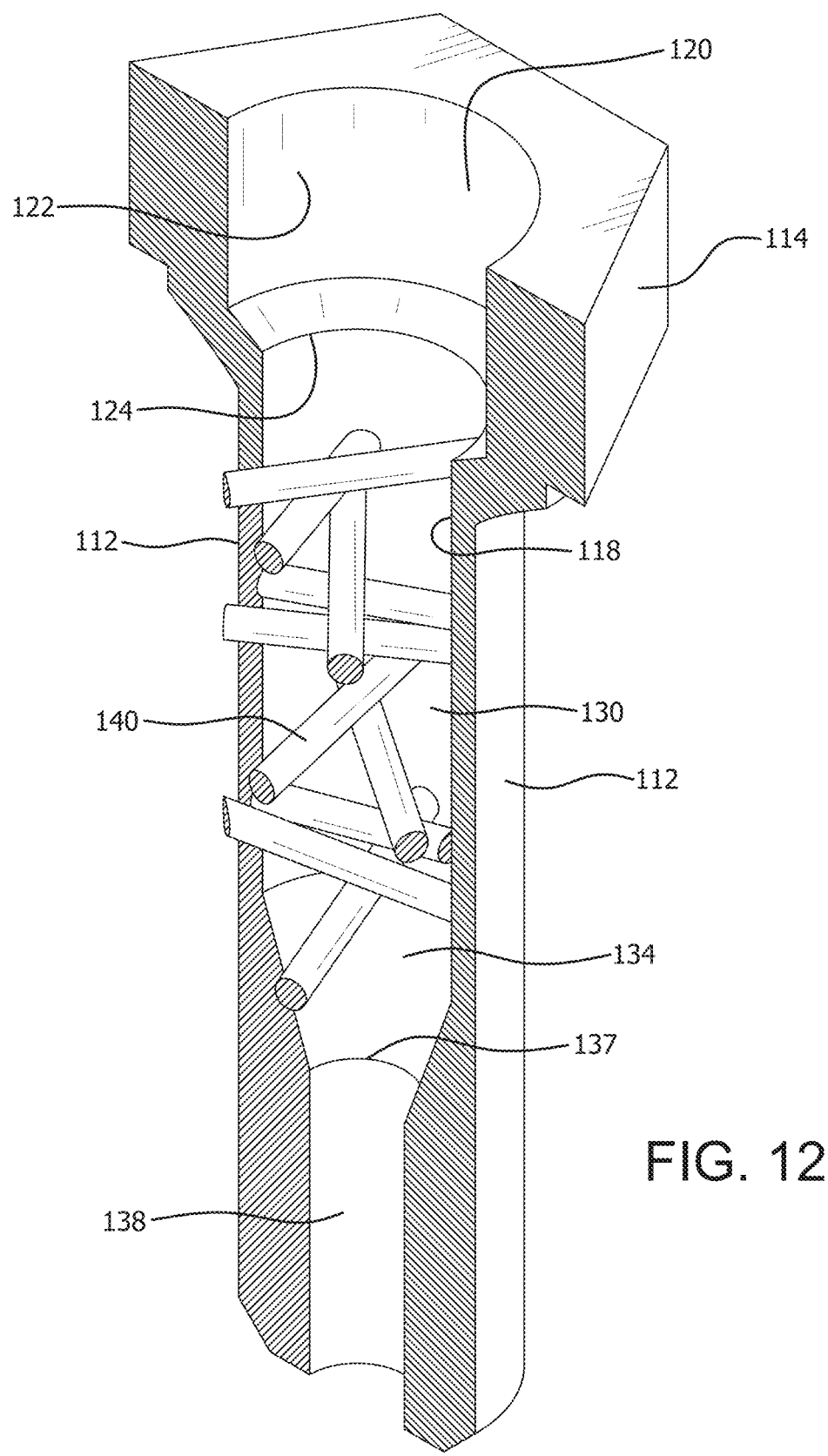
FIG. 12 is a perspective view of the cross-section of FIG. 10.

There is shown in FIGS. 7-8 a depiction of the operation of the nozzle 10. Additive manufacturing material 52 which contains long fibers 50 and possibly short fibers 54 enters through the opening 20 in the head 14. Long fibers 50 and possibly short fibers 54 can accumulate around air pockets 58. As the combined additive manufacturing material 52 with long fibers 50, possibly short fibers 54 and also air pockets 58, progresses through the static mixing channel 30 the combination of materials begins to impact with the static mixing rods 40. These impacts break up the bubbles and clumps of long fibers 50 and possibly short fibers 54 into smaller air bubbles 60 and disperse the long fibers 50 and short fibers 54 throughout the additive manufacturing material 52. The combination of materials then enters the compression portion 13, where the reducing diameter, reduced by the incline of the wall 36, further compresses and reduces the air bubbles into very small bubbles 64. The combination then enters the alignment channel 38 where the additive manufacturing material 52 is further compresses and the long fibers 54 are aligned and remain unclumped.

There is shown in FIGS. 9-12 an alternative embodiment of a nozzle 100 which includes a static mixing portion 111, a compression portion 113, and a long fiber alignment portion 115. The nozzle 100 has also body 112 and a nozzle head 114, a proximal end 123 and a distal end 126. The nozzle body 112 has an inner channel wall 118 defining a static mixing channel 130 with a static mixing channel inlet 124 and a static mixing channel outlet 125. Spaces 119 between the static mixing rods 140 allow for the passage of additive manufacturing material and long fibers. Within the static mixing channel 130 are plurality of static mixing rods 140. The static mixing rods 140 extend from one connecting location 141 on the channel wall 118 to another connecting location 143 on the channel wall 118. The connecting locations of a static-mixing rod 140 are at different longitudinal positions of the channel wall, so that the static mixing rods 140 are inclined by an angle θ with respect to the channel wall 118 and/or the axis $A_{FC}$. The static-mixing rods 140 can intersect the longitudinal center axis $A_{FC}$ of the static-mixing channel 130.

The nozzle 100 has an opening 120 in the head 114 defined by wall 122 and leads to the static mixing channel inlet 124. The flow channel 130 communicates through the static mixing channel outlet 125 with a compression portion 113 which includes a compression channel 134 defined by an inclined wall 136 such that the compression channel 134 has a reducing diameter in the direction of flow from the proximal end 123 to the distal end 126. The compression channel 134 has an outlet 137 which can serve as an inlet to a long fiber alignment channel 138 of the long fiber alignment portion 115, which is defined by a wall 139. The compression channel 138 has a material outlet 128 at the distal end 126 of the nozzle 100.

Figure 13:
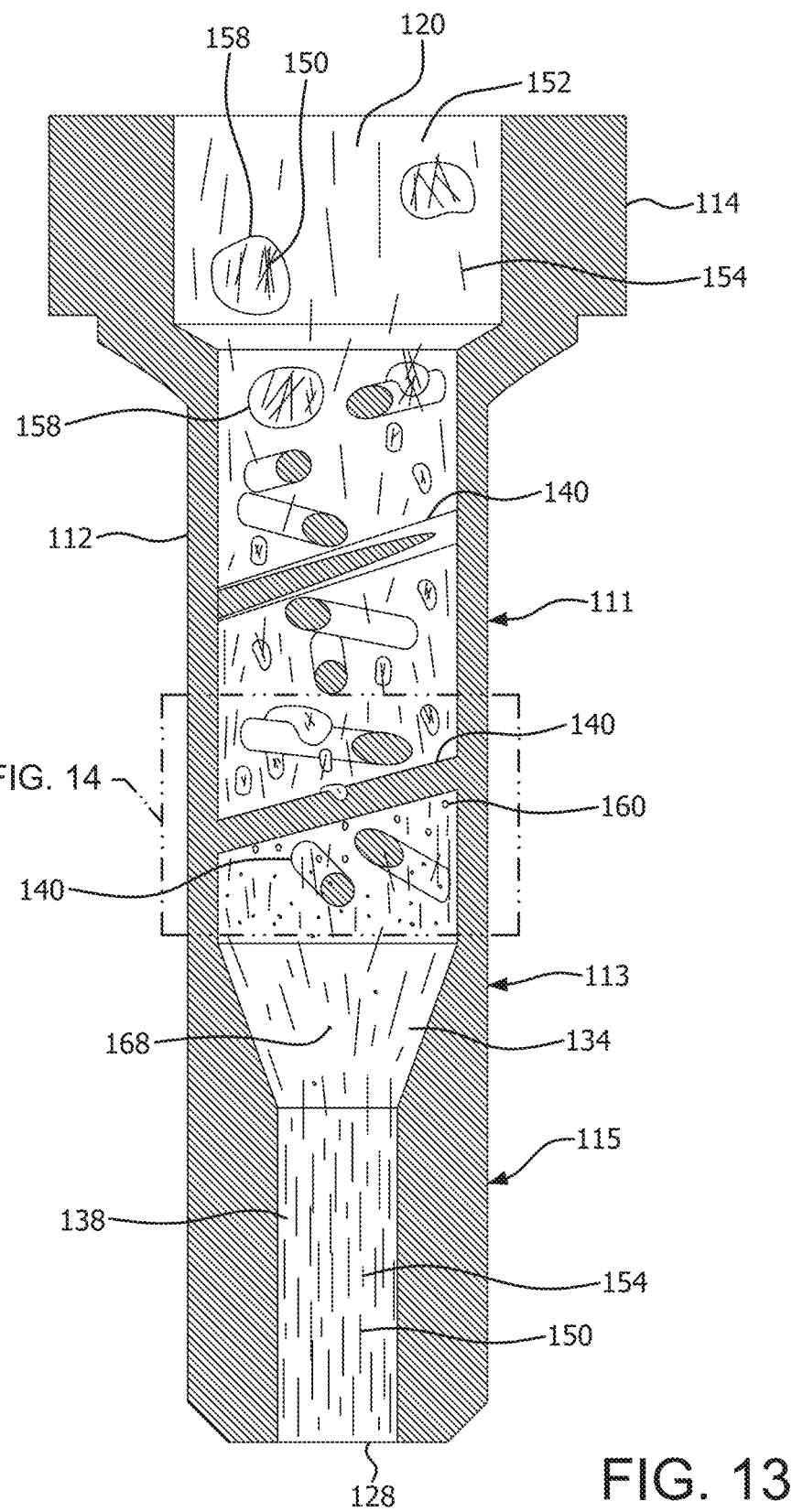
FIG. 13 is a cross-section taken along line 10-10 in FIG. 9, and illustrating operation of the static-mixing nozzle.
Figure 14:
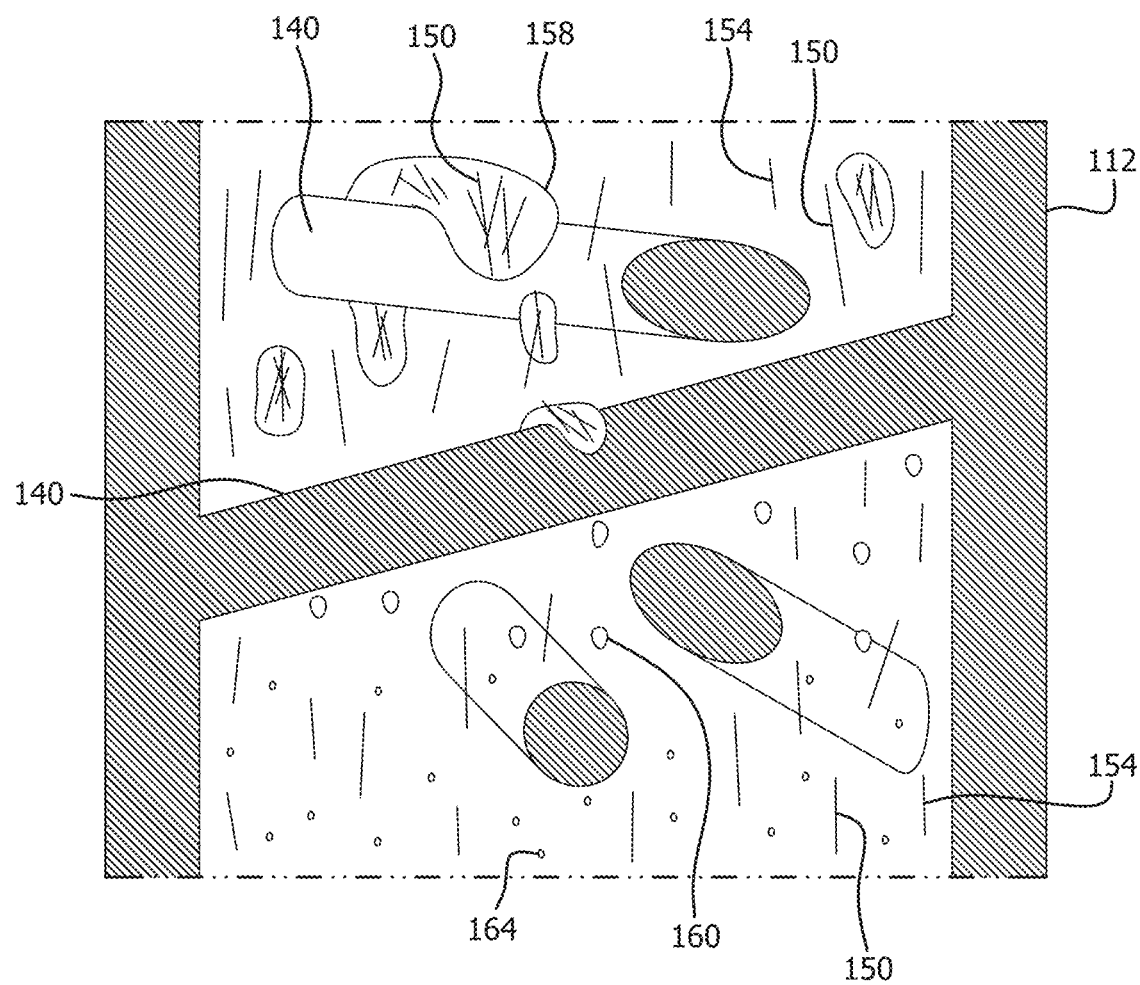
FIG. 14 is an expanded view of area FIG. 14 in FIG. 13.

There is shown in FIGS. 13-14 a depiction of the operation of the nozzle 100. Material flows through the static mixing portion 111 to the compression portion 113 and into the static mixing channel 130 where it contacts the inclined static mixing rods 140. Long fibers 150 and possible short fibers 154 and any air pockets 158 contact the static mixing rods 140. The long fibers 150 and short fibers 154 are dispersed and thereby randomized within the additive manufacturing material 152 by these impacts and the bubbles reduced in size to smaller bubbles 160. The bubbles are reduced further as the additive material progresses through the static mixing channel tor still smaller bubbles 164. The combination then flows to the compression channel 134 of the compression portion 113 where the material is compressed to further remove and reduce the size of air bubbles to a smallest size bubbles 168. The combination then flows to the long fiber alignment portion 115 where it is further compressed and the long fibers 150 are aligned. Material then flows from the outlet 128 where it is extruded as a bead in an additive manufacturing process.

Figure 15:
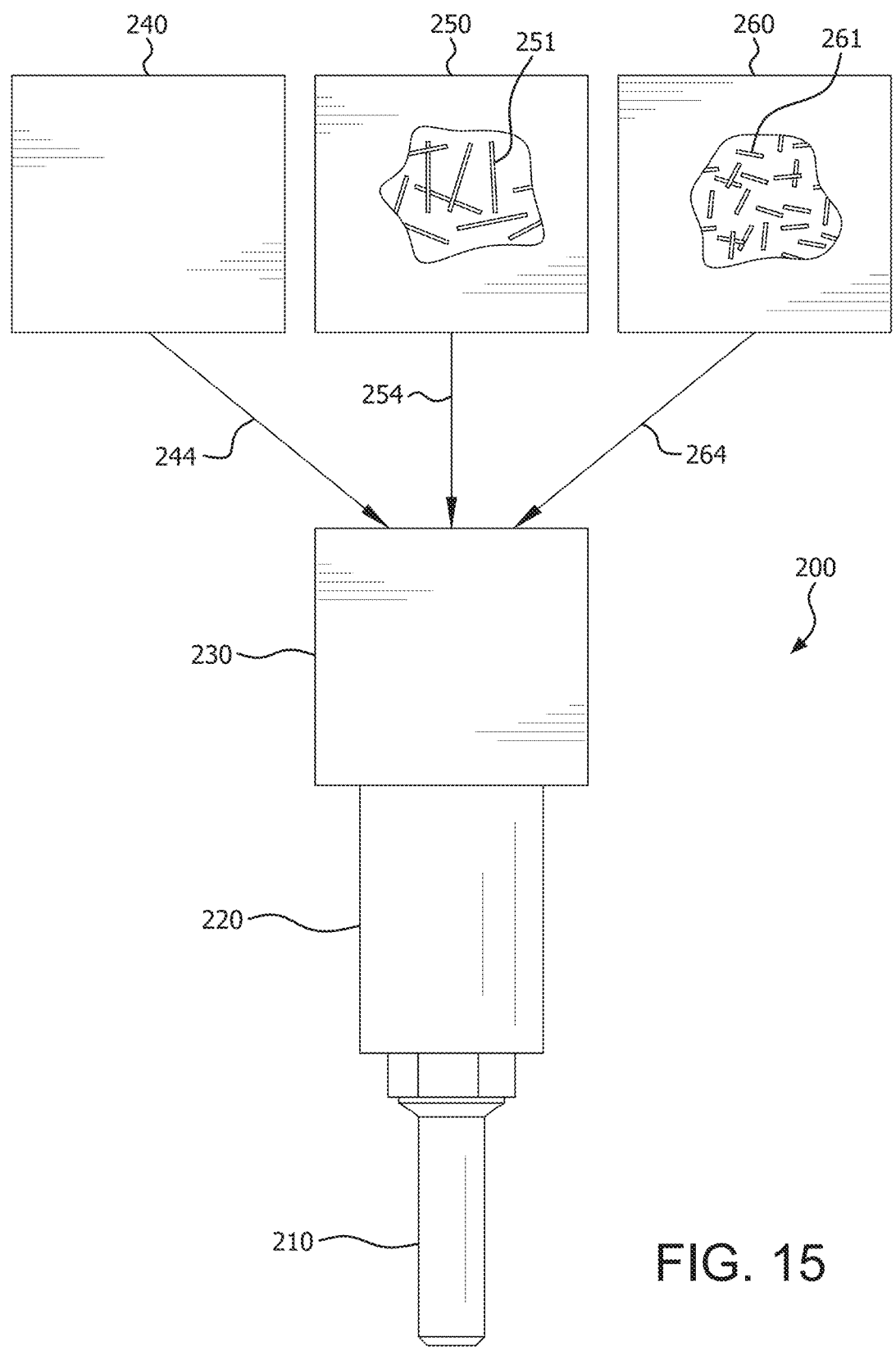
FIG. 15 is a schematic diagram of an extruder system.

There is shown in FIG. 15 an extruder system 200. The nozzle of the invention can be used with a variety of different extruder systems for additive manufacturing with short-chopped fibers. A generalized depiction of an extruder system 200 is show in FIG. 26. The extruder system 200 includes a nozzle 210, a barrel 220 and a mixing manifold 230. A source of additive manufacturing material 240 provides additive manufacturing material though connection 244 to the mixing manifold 230. A source of long fibers 250 provides long fibers to the mixing manifold through connection 254. Optionally, a source of short-chopped fibers 260 provides short-chopped fibers to the mixing manifold 230 through a connection 264. Other components of additive manufacturing are well known in the art.

Short and long fibers were used to prepare composites using an AM-CM process. Samples were created on a BAAM system using a conventional 0.4-inch nozzle and a mixing 0.4-inch nozzle. Two materials of interest were used, long glass fiber thermoplastic polyurethane (LGF TPU, colored black) and short glass fiber acrylonitrile butadiene (SGF ABS, colored orange) from Techmer PM. Both materials contained 40% glass fiber by weight and were mixed using the pellet mixer for BAAM and processed through the BAAM extruder.

The LGF TPU started as 12 mm pellets, while the SGF ABS is a 4 mm short-chopped fiber pellet. The 12 mm LGF pellets were cut into approximately 6 mm by hand for two samples to observe any potential differences between initial fiber lengths. Two different nozzle geometries were used during the prints, a conventional 0.4 in nozzle diameter and the second being a custom static mixing nozzle with a 0.4 in nozzle diameter. Prints completed with the nozzles had a layer height of 3.81 mm (0.15 in), and a bead width of 12.7 mm (0.5 in). Single bead (1 perimeter) boxes were manufactured with a joining wall between the two boxes with a double bead width to minimize start and stops between layers with a layer time of 1.5 min.

To create compression molded samples, charges were cut from the printed boxes. The charges cut measured approximately 215-230 g to allow for extra material to ensure the plaques are solid for sample collection. The final compression molded plaque was found to be approximately 200 g. Charges were placed in a square aluminum mold with a 152×152 mm square cutout with a thickness of 5 mm final compressed plaque thickness, such that the print direction is aligned in one direction of the plaque with the Z-direction the perpendicular position.

The platens of the compression system were heated to 415 F and allowed to soak for 2 min. The mold and charge were placed and then compressed such that each end of the mold is in contact with the platens, with slight pressure applied to allow for heat transfer into the mold and charge.

After a soak time of 5 min, the material was compressed at a pressure of 1-2 tons for a time of 5 min. The pressure was then increased to 8 tons for an additional 5 min. The platens were then cooled, and the pressure and mold are released once the overall temperature of the system reaches 160 F. The compression-molded plaque was removed for water jet cutting.

As more long fibers were introduced into the extruder, the porosity in extrudates increased significantly, and it became more challenging to manufacture 3D printed structures. In addition, long fiber pellets tend to capture more air during feeding, creating voids that expand once the extrudate exits through the nozzle. Computerized tomography (CT) scans of these samples indicated the presence of fiber pockets including highly misaligned fibers that swirl around the bead.

A static mixing nozzle according to the invention was used to aid material mixing throughout the melt stream. Samples created using the mixing nozzle had a more uniform color, visually indicating that the fibers mixed throughout the polymer more successfully. In addition, the static mixing nozzle is capable of not only mixing the materials but also helps to reduce large pores in the beads, creating more uniform and solid cross sections within the structure.

Introduction of the mixing nozzle helped to remove the fiber swirling pockets which indicated better resin mixing, but as well aided in porosity sizes to decrease/better disperse pockets across the bead. The benefit of the mixing nozzle was observed to increase as the long fiber pellet percentage increased. The difference enables more uniform bead deposition to create higher quality parts. Another approach to reducing inhomogeneous regions was to reduce the overall pellet length of the LGF TPU by cutting the 12 mm pellets down to a 6 mm pellet length. This change created samples with more consistent feed and more homogeneous-looking beads.

Figure 16:
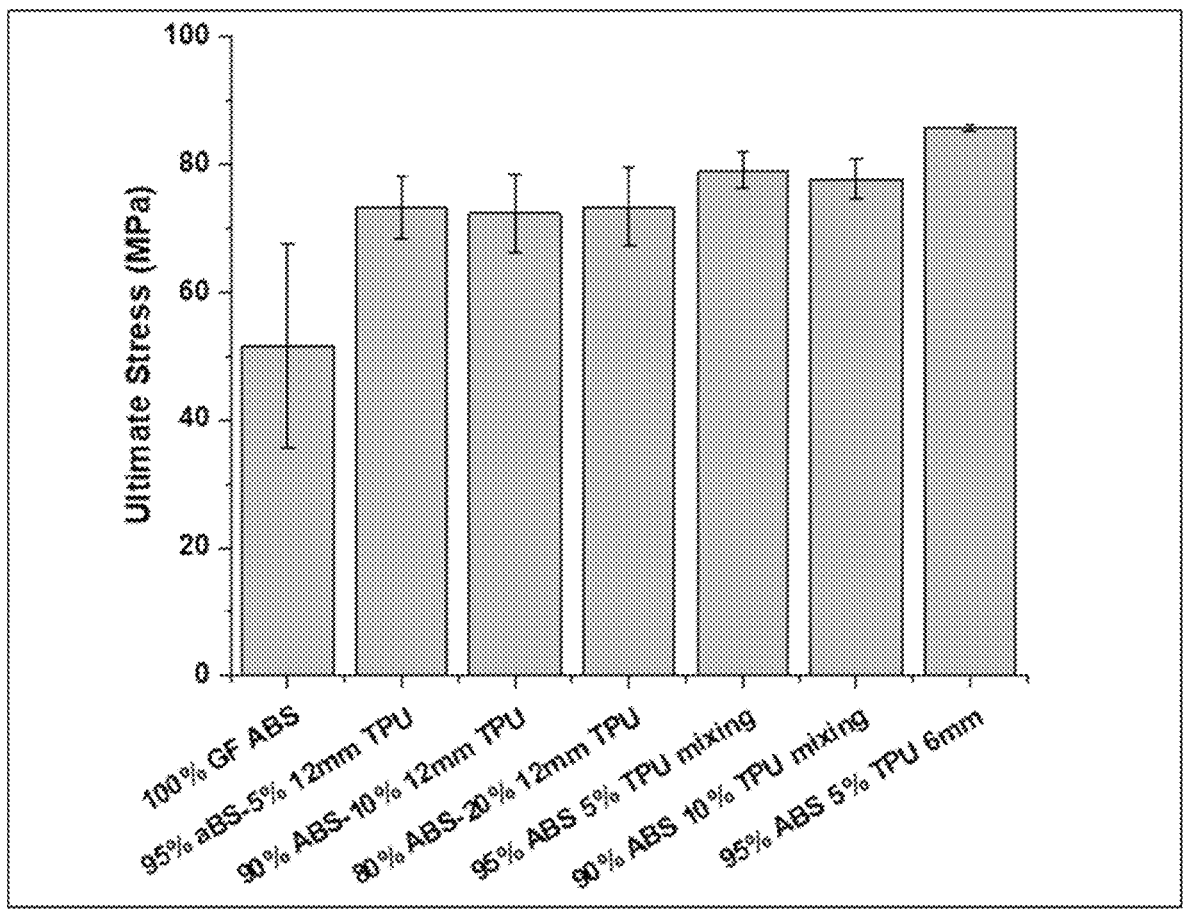
FIG. 16 is a plot of ultimate stress (MPa) for different additive manufacturing materials and processes.
Figure 17:
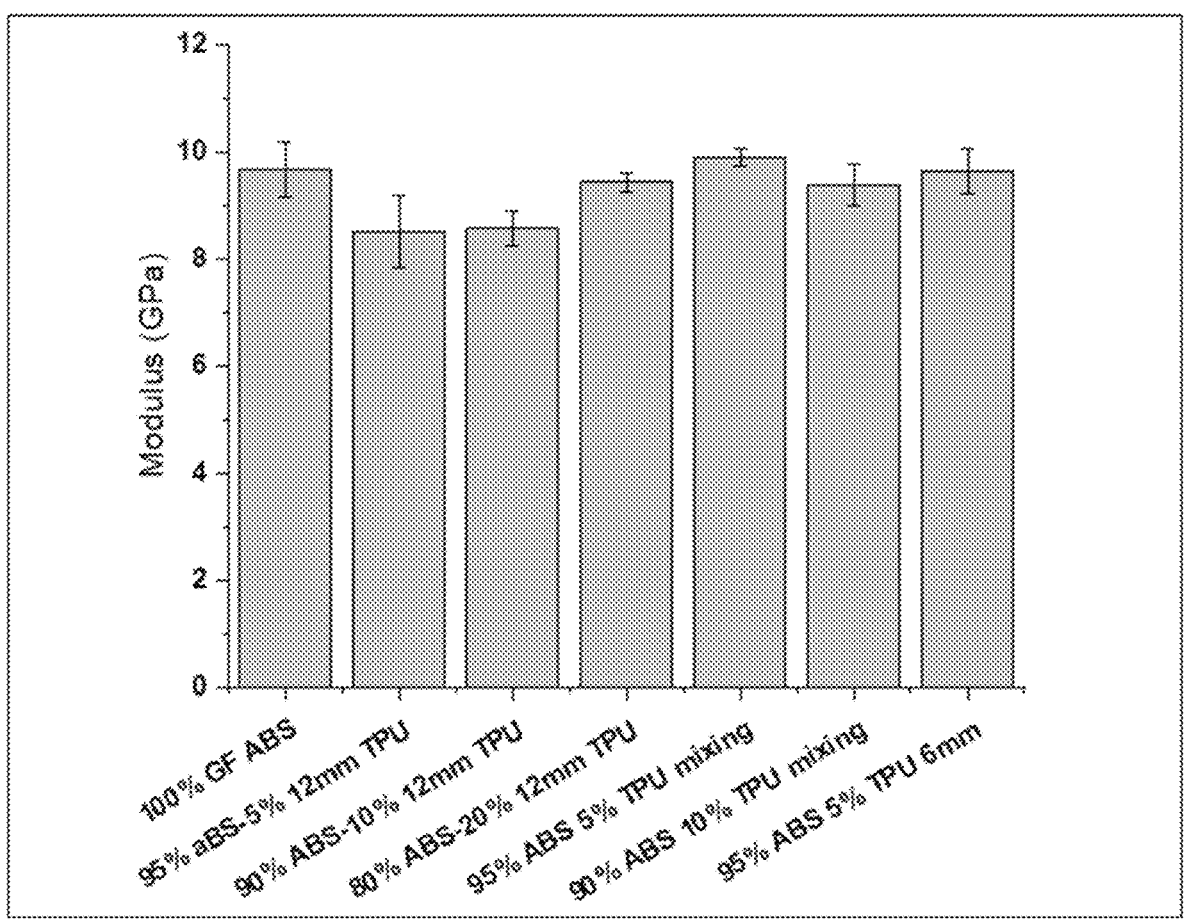
FIG. 17 is a plot of modulus (GPa) for different additive manufacturing materials and processes.

The tensile testing results are shown in FIGS. 16-17 to compare the impact of long fiber quantity, pellet length at the start, and nozzle type-mixing vs. conventional, on the composite's strength and stiffness properties.

Materials with long glass fiber displayed a slight increase in stress along with a drop in the overall modulus using the conventional nozzle. With increasing LGF TPU content, the stress and modulus remained nearly constant. A non-significant increase in modulus could be caused by fiber breakage in the screw or a lack of aligned fibers to allow for load transfer. As the quantity of long fiber increases, the porosity in the as-printed sample increases as well. During compression molding, porosity is removed from the material, but some air pockets remain trapped and become smaller pores. If the number of pores in the compression-molded samples increases as a function of long fiber quantity, it could drop mechanical performance. Likewise, if the long fiber added to the system undergoes significant breakage during extrusion due to shear and other harsh processing conditions, long fiber's benefits can be significantly reduced. In addition, the alignment of the long fibers is key to maximizing their reinforcing potential since the as-printed samples contained large pockets of poorly aligned long fiber, which were more numerous as the long fiber content increased.

Mixing the material with a static mixing nozzle improved the stiffness and strength marginally while reducing the overall variance within the data. The static mixing nozzle was designed to mix two resins during extrusion. As such, material output from the system should be more uniform, removing islands of long fiber and making the overall structure more consistent. While all the 12 mm length pellets are similar in strength and modulus, the 6 mm length TPU pellets were found to increase the strength of the composite significantly. Smaller fibers are easier to process during extrusion, leading to lower porosity and less fiber breakage in the screw. Additionally, a more consolidated and uniform polymer melt with less fiber swirling in the screw can increase fiber alignment along the print direction, leading to an increase in mechanical properties.

Fracture surface images of the broken samples indicate that porosity in the compression-molded samples increased with the mixing nozzle but had a more uniform texture and fewer gradients of material islands than the conventional nozzle prints. In addition, the fracture surface became rougher with increasing long fiber content, especially in the case of the 20% LGF TPU sample in which the break travels down the gauge length of the sample. The mechanical data and fracture surfaces indicate that the long fiber being introduced into the matrix affects the overall fracture response of the structure, improving the composite quality.

The static mixing nozzle of the invention provides long fiber dispersion into a polymer melt stream in a consolidated fashion. The nozzle further creates more uniform transition zones within a printed structure. The nozzle mixes the materials for the transition zone of the part to create a more uniform printed structure. The invention can be used generally in fields such as manufacturing and/or materials processing, and for such uses as wind turbine blade manufacturing, large scale polymer additive manufacturing tooling, and multi-material printing, among others. Well mixed material beads will allow for higher property control during a multi-material print reducing build time, waste, and providing more consistent results.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. An additive manufacturing system for additive manufacturing material with long fibers, comprising:

an extruder comprising a nozzle that includes a static-mixing portion, a compression portion, and a long fiber alignment portion;

the static-mixing portion comprising a static-mixing channel defined by a channel wall, the static-mixing channel having a longitudinal center axis, a circumference, a diameter DSMC and a length LSMC, an input end and an opposing output end, the static-mixing channel being fluidically coupled at the input end to feeding means through which additive manufacturing material and long fibers are to be provided to the extruder, the static-mixing channel comprising static-mixing rods distributed inside the static-mixing channel and extending radially inward from the channel wall, the static-mixing rods being elongated and having a length and a width with the length being at least twice as long as the width, the static-mixing rods comprising curved side surfaces, the static-mixing rods having a diameter DSMR, and being longitudinally distributed over a portion of the length LSMC of the static-mixing channel and radially staggered about the circumference of the channel wall, and wherein spaces between the static-mixing rods define flow openings for the additive manufacturing material and the long fiber;

wherein the long fiber alignment portion comprises an alignment channel having an input end and an output end and a diameter $D_{AC}$ that is less than the diameter DSMC of the static-mixing channel, and has a length longer than the length of the long fibers;

wherein the compression portion comprises a compression channel with an input end communicating with the output end of the static-mixing channel, and an output end communicating with the input end of the alignment channel, the compression channel having a reducing diameter from the input end to the output end of the compression channel, the compression channel fluidically coupling the larger diameter static-mixing channel to the smaller diameter alignment channel;

wherein the static-mixing portion is configured to guide the provided additive manufacturing material and long fiber from the input end to the compression portion, cause bundles of the long fiber to separate as they are guided through the openings formed by the static-mixing rods inside the static-mixing channel to disperse the long fiber of the separated bundles through the additive manufacturing material, and transfer the additive manufacturing material with the long fiber dispersed therethrough to the compression portion, wherein the compression channel compresses and guides the additive manufacturing material and long fiber from the static-mixing channel to the input end of the alignment channel, and wherein the alignment channel further compresses the additive manufacturing material with the long fiber dispersed therethrough to align the dispersed long fiber, guide the compressed additive manufacturing material with the aligned long fiber to the output end of the alignment channel, and extrude, through the output end of the alignment channel, a bead of compressed additive manufacturing material with the long fiber dispersed and aligned therethrough, causing the extruded bead to be deposited as part of a layer of an object being formed by the additive manufacturing material and long fiber.

2. The system of claim 1, wherein the static-mixing rods are cylindrical.

3. The system of claim 1, wherein the static-mixing channel is tubular.

4. The system of claim 1, wherein the static-mixing rods extend from one connecting location on the channel wall to another connecting location on the channel wall.

5. The system of claim 4, wherein the connecting locations of a static-mixing rod are at different longitudinal positions of the channel wall.

6. The system of claim 4, wherein the static-mixing rods intersect the longitudinal center axis of the static-mixing channel.

7. The system of claim 1, wherein the compression channel is conical.

8. The system of claim 1, wherein the static-mixing rods are axially spaced apart from each other by separations ranging from 0 to 5×DSMR.

9. The system of claim 1, wherein a length range of the long fiber is 0.5 mm to 30 mm.

10. The system of claim 1, further comprising short-chopped fibers.

11. The system of claim 10, wherein a fiber aspect ratio is defined as s=where L is the fiber's length and d is the fiber's diameter, and the fiber aspect ratio of the short-chopped fiber satisfies s<100, and the fiber aspect ratio of the long fiber satisfies s>100.

12. The system of claim 10, wherein a fraction of long fiber from the total of short-chopped fiber and long fiber is in a range of 5%-100% by weight.

13. The system of claim 10, wherein the long fiber and the short-chopped fiber comprises at least one selected from the group consisting of carbon fiber, glass fiber, or bio fiber.

14. The system of claim 1, wherein the additive manufacturing material comprises thermoplastic resin.

15. A static-mixing nozzle for an additive manufacturing system, comprising:

a static-mixing portion, a compression portion, and a long fiber alignment portion;

the static-mixing portion comprising a static-mixing channel defined by a channel wall, the static-mixing channel having a longitudinal center axis, a circumference, a diameter DSMC and a length LSMC, an input end and an opposing output end, the static-mixing channel being fluidically connectable at the input end to feeding means through which additive manufacturing material and long fibers are to be provided, the static-mixing channel comprising static-mixing rods distributed inside the static-mixing channel and extending radially inward from the channel wall, the static-mixing rods being elongated and having a length and a width with the length being at least twice as long as the width, the static-mixing rods comprising curved side surfaces, the static-mixing rods having a diameter DSMR, and being longitudinally distributed over a portion of the length LSMC of the static-mixing channel and radially staggered about the circumference of the channel wall, and wherein spaces between the static-mixing rods define flow openings for the additive manufacturing material and the long fiber;

wherein the long fiber alignment portion comprises an alignment channel having an input end and an output end and a diameter DAC that is less than the diameter DSMC of the static-mixing channel, and has a length longer than the length of the long fibers;

wherein the compression portion comprises a compression channel with an input end communicating with the output end of the static-mixing channel, and an output end communicating with the input end of the alignment channel, the compression channel having a reducing diameter from the input end to the output end of the compression channel, the compression channel fluidically coupling the larger diameter static-mixing channel to the smaller diameter alignment channel;

wherein the static-mixing portion is configured to guide the provided additive manufacturing material and long fiber from the input end to the compression portion, cause bundles of the long fiber to separate as they are guided through the openings formed by the static-mixing rods inside the static-mixing channel to disperse the long fiber of the separated bundles through the additive manufacturing material, and transfer the additive manufacturing material with the long fiber dispersed therethrough to the compression portion, wherein the compression channel compresses and guides the additive manufacturing material and long fiber from the static-mixing channel to the input end of the alignment channel, and wherein the alignment channel further compresses the additive manufacturing material with the long fiber dispersed therethrough to align the dispersed long fiber, guide the compressed additive manufacturing material with the aligned long fiber to the output end of the alignment channel, and extrude, through the output end of the alignment channel, a bead of compressed additive manufacturing material with the long fiber dispersed and aligned therethrough, causing the extruded bead to be deposited as part of a layer of an object being formed by the additive manufacturing material and long fiber.

16. A method for additive manufacturing with additive manufacturing material and long fibers, comprising the steps of:

provided an extruder comprising a nozzle that includes a static-mixing portion, a compression portion, and a long-fiber alignment portion, the static-mixing portion comprising a static-mixing channel defined by a channel wall, the static-mixing channel having a longitudinal center axis, a circumference, a diameter DSMC and a length LSMC, an input end and an opposing output end, the static-mixing channel being fluidically coupled at the input end to feeding means through which additive manufacturing material and long fibers are to be provided to the extruder, the static-mixing channel comprising static-mixing rods distributed inside the static-mixing channel and extending radially inward from the channel wall, the static-mixing rods being elongated and having a length and a width with the length being at least twice as long as the width, the static-mixing rods comprising curved side surfaces, the static-mixing rods having a diameter DSMR, and being longitudinally distributed and radially staggered over a portion of the length LSMC of the static-mixing channel, and wherein spaces between the rods define flow openings for the additive manufacturing material and the long fiber;

wherein the long fiber alignment portion comprises an alignment channel having a diameter DAC that is less than the diameter DSMC of the flow channel, and a length longer than the long fibers; wherein the compression portion comprises a compression channel with an input end communicating with the output end of the static-mixing channel, and an output end communicating with the input end of the alignment channel, the compression channel having a reducing diameter from the input end to the output end of the compression channel, the compression channel fluidically coupling the larger diameter static-mixing channel to the smaller diameter alignment channel;

guiding the provided additive manufacturing material and long fiber through the static-mixing portion from the input end to the compression portion, causing bundles of the long fiber to separate as they are guided through the openings formed by the static-mixing rods inside the static-mixing channel to disperse the long fiber of the separated bundles through the additive manufacturing material;

transferring the additive manufacturing material with the long fiber dispersed therethrough to the compression channel, wherein the compression channel compresses and guides the additive manufacturing material and long fiber from the static-mixing channel to the alignment channel;

further compressing the additive manufacturing material with the long fiber dispersed therethrough in the alignment channel to align the dispersed long fiber; guiding the compressed additive manufacturing material with the aligned long fiber to the output end of the alignment channel; and, extruding, through the output end, a bead of compressed additive manufacturing material dispersed with the long fiber dispersed and aligned therethrough, causing the extruded bead to be deposited as part of a layer of an object being formed by the additive manufacturing material and long fiber.

17. The method of claim 16, further comprising the step of adding short-chopped fibers to the additive manufacturing material and the long fibers prior to entering the static-mixing channel, wherein the static-mixing rods will mix the short-chopped fibers with the ling fibers and the additive manufacturing material.

\* \* \* \* \*